United States Patent [19]
Benash et al.

[11] Patent Number: 6,084,892
[45] Date of Patent: Jul. 4, 2000

[54] PUBLIC IP TRANSPORT NETWORK

[75] Inventors: Ray Benash, Havertown, Pa.; Kenneth P. D'Andrea, Marlton, N.J.

[73] Assignee: Bell Atlantic Networks Services, Inc., Arlington, Va.

[21] Appl. No.: 08/816,229

[22] Filed: Mar. 12, 1997

Related U.S. Application Data

[63] Continuation-in-part of application No. 08/815,363, Mar. 11, 1997.

[51] Int. Cl.[7] .................................................. H04L 12/66
[52] U.S. Cl. .............................. 370/701; 379/221
[58] Field of Search ..................... 370/352, 356, 370/400, 401, 410, 463, 552; 379/219, 221

[56] References Cited

U.S. PATENT DOCUMENTS

| | | | |
|---|---|---|---|
| 5,247,571 | 9/1993 | Kay et al. ................................. | 379/207 |
| 5,309,437 | 5/1994 | Pelman et al. ........................... | 370/401 |
| 5,406,557 | 4/1995 | Baudoin . | |
| 5,430,727 | 7/1995 | Callon .................................... | 370/401 |
| 5,475,732 | 12/1995 | Pester .................................... | 379/34 |
| 5,661,791 | 8/1997 | Panket et al. ........................... | 379/221 |
| 5,790,548 | 8/1998 | Sistanizadeh et al. .................. | 370/400 |
| 5,933,490 | 8/1999 | White et al. ............................ | 379/221 |
| 5,978,450 | 11/1999 | McAllister et al. ................. | 379/88.02 |
| 5,982,870 | 11/1999 | Pershan et al. ......................... | 379/221 |
| 5,995,618 | 11/1999 | Brodley et al. ......................... | 379/333 |

Primary Examiner—Douglas W. Olms
Assistant Examiner—Ken Vanderpuye
Attorney, Agent, or Firm—McDermott, Will & Emery

[57] ABSTRACT

Equal access IP transport and Internet services are provided using a public switched telephone serving a plurality of defined geographic areas (LATAs). A switched multimegabit data service (SMDS) network and a frame relay network spans the geographic areas. A plurality of Internet service providers (ISPs) are connected to the SMDS network. A data hub node, connected to both the SMDS network and the frame relay network in each geographic area, includes a gateway router connected via a packet switch and at least one network access server to one of the central office switching systems. A central maintenance center monitors and maintains the wide area communications network through the SMDS and frame relay networks and data hub nodes. An ISP may setup conditions for redirection of all or a portion of a load to one or more network access servers in the hub for routing over the SMDS network in the event of overload.

22 Claims, 13 Drawing Sheets

|   | CUST_ANI (TELEPHONE) | CUST_ZIP 4 (INTEGER) |
|---|---|---|
| 1 | 301-300-2010 | 212301234 |
| 2 | 301-300-3276 | 222221111 |
| 3 | 301-393-2503 | 212301235 |
| ⋮ | ↓ | ↓ |
| N | 301-393-4567 | 222221789 |

| EXTENDED ZIP CODE | DESIGNATED COMPANY PORT |
|---|---|
| 21230-4124 | 301-774-3456 |
| 21230-4125 | 301-774-3456 |
| 21250-4126 | 301-388-1211 |
| ↓ | ↓ |
| 21230-9999 | 301-388-1211 |

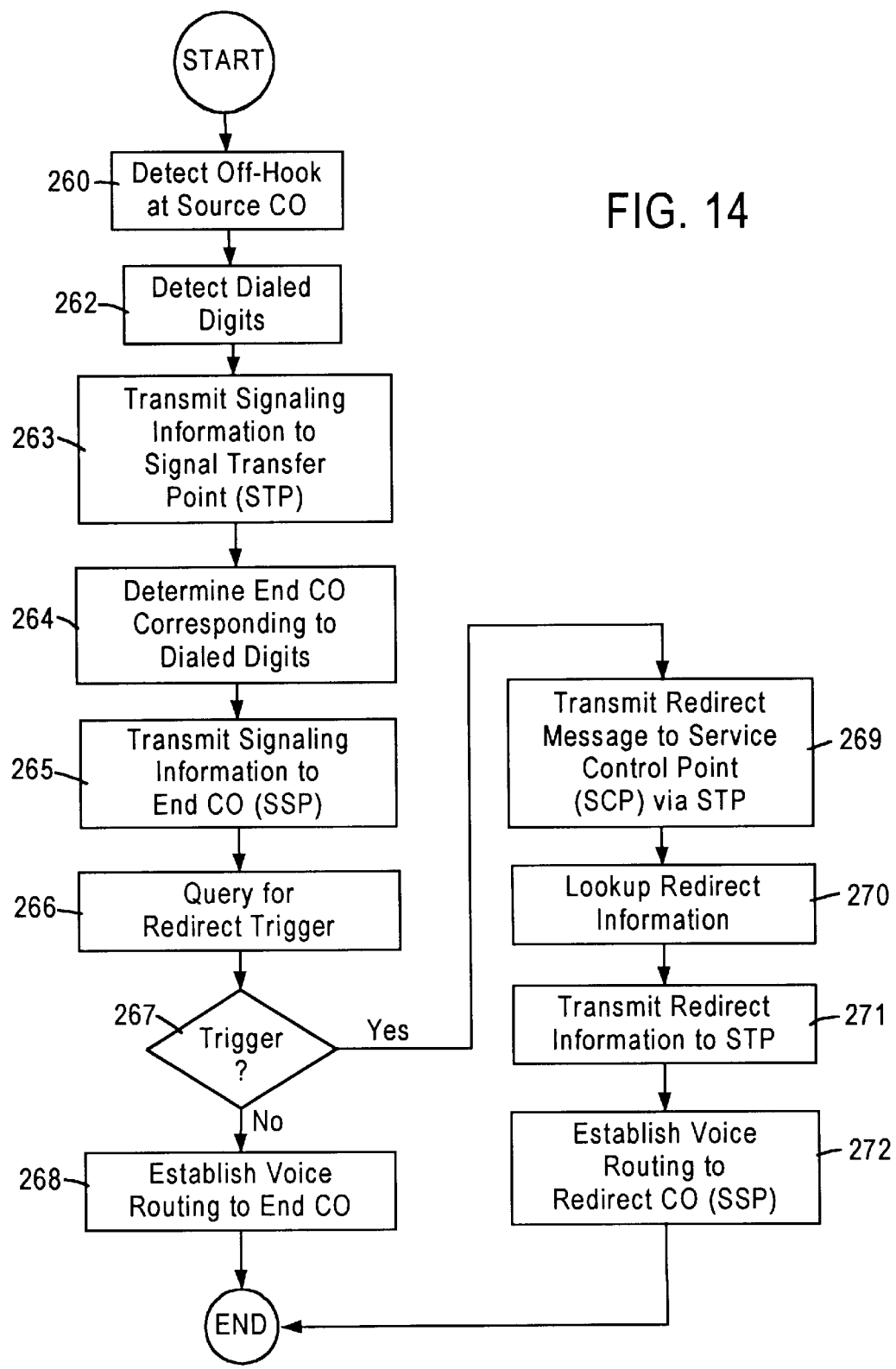

FIG. 15(a)

| Main Number | Option #1 | Option #2 | Option #3 |
|---|---|---|---|
| 301-236-1399 | 301-236-1399 | 301-774-4244 | 301-649-1939 |
| 301-236-7352 | 301-236-7352 | 301-236-1734 | 410-997-5080 |
| 301-236-1555 | 301-236-1555 | 215-466-8486 | 215-466-4626 |
| 301-236-4087 | 301-236-4087 | 215-466-5272 | 201-649-1939 |

FIG. 15(b)

| Main Number | Mon. - Fri. 08:00-17:00 | Sat. 08:00-12:00 | Other |
|---|---|---|---|
| 301-236-1399 | 301-236-1399 | 301-236-1764 | 301-236-1555 |
| 301-236-7352 | 301-236-7352 | 301-236-2048 | 215-466-8486 |
| 301-236-1555 | 301-236-9874 | 215-466-7352 | 215-466-5272 |
| 301-236-4087 | 301-236-4696 | 201-649-1939 | 201-649-4789 |

FIG. 15(c)

| Main Number | 70% | 20% | 10% |
|---|---|---|---|
| 301-236-1399 | 301-236-1399 | 301-236-1764 | 301-236-2287 |
| 301-236-7352 | 301-236-7352 | 301-236-2048 | 215-466-8486 |
| 301-236-1555 | 301-236-1555 | 215-466-7352 | 215-466-5272 |
| 301-236-4087 | 301-236-4087 | 201-649-1939 | 201-649-4789 |

PUBLIC IP TRANSPORT NETWORK

RELATED APPLICATIONS

This application is a continuation-in-part of application Ser. No. 08/815,363, filed Mar. 11, 1997, entitled Public IP Transport Network. The application is related to application Ser. No. 08/388,058, filed Feb. 10, 1995, entitled Method and Apparatus for Routing Calls Placed to a Virtual Telephone Number, and to application Ser. No. 07/888,098 now U.S. Pat. No. 5,982,870, filed May 26, 1992, entitled Method for Concurrently Establishing Switch Redirection for Multiple Lines of the Telephone Network. The foregoing applications are owned by the assignee of the instant application.

FIELD OF THE INVENTION

This invention relates generally to the integration of multiple types of local area networks (LANs) into a wide area network (WAN) using a set of protocols generally known as TCP/IP where TCP stands for Transmission Control Protocol, and IP is Internet Protocol. The invention provides multiple types of interconnection using PSTN (Public Switched Telephone Network) facilities to provide cost effective IP internetwork data transport. The system will provide an equal access model pursuant to the MFJ (Modified Final Judgment) and currently applicable statutes for accessing inter-LATA Internet carriers. The following background material introduces various computer network concepts and definitions and those familiar with computer networks and TCP/IP may wish to skip to following subsections.

Computer Network Background

A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

A bridge is a device that is connected to at least two LANs and serves to pass message frames or packets between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network. A detailed knowledge of network architecture is not needed for an understanding of this invention, but a brief description follows by way of further background.

At the heart of any computer network is a communication protocol. A protocol is a set of conventions or rules that govern the transfer of data between computer devices. The simplest protocols define only a hardware configuration, while more complex protocols define timing, data formats, error detection and correction techniques and software structures.

Computer networks almost universally employ multiple layers of protocols. A low-level physical layer protocol assures the transmission and reception of a data stream between two devices. Data packets are constructed in a data link layer. Over the physical layer, a network and transport layer protocol governs transmission of data through the network, thereby ensuring end-to end reliable data delivery.

The most common physical networking protocol or topology for small networks is Ethernet, developed by Xerox. When a node possesses a packet to be transmitted through the network, the node monitors the backbone and transmits when the backbone becomes clear. There is no central backbone master device to grant requests to gain access to the backbone. While this type of multipoint topology facilitates rapid transmission of data when the backbone is lightly utilized, packet collisions may occur when the backbone is heavily utilized. In such circumstances, there is a greater chance that multiple nodes will detect that the backbone is clear and transmit their packets coincidentally. If packets are impaired in a collision, the packets are retransmitted until transmission is successful.

Another conventional physical protocol or topology is Token Ring, developed by IBM. This topology employs a "token" that is passed unidirectionally from node to node around an annular backbone. The node possessing the token is granted exclusive access to the backbone for a single packet transfer. While this topology reduces data collisions, the latency incurred while each node waits for the token translates into a slower data transmission rate than Ethernet when the network is lightly utilized.

As computer networks have developed, various approaches have been used in the choice of communication medium, network topology, message format, protocols for channel access, and so forth. Some of these approaches have emerged as de facto standards, but there is still no single standard for network communication. However, a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers:

a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

Bridges may be designed to operate in the MAC sublayer. Further details may be found in "MAC Bridges," P802.1D/D6, September 1988, a draft publication of IEEE Project 802 on Local and Metropolitan Area Network Standards, or in later drafts of this document.

The basic function of a bridge is to listen "promiscuously," i.e., to all message traffic on all LANs to which it is connected, and to forward each message it hears onto LANs other than the one from which the message was heard. Bridges also maintain a database of station locations, derived from the content of the messages being forwarded. Bridges are connected to LANs by paths known as "links." After a bridge has been in operation for some time, it can associate practically every station with a particular link connecting the bridge to a LAN, and can then forward messages in a more efficient manner, transmitting only over the appropriate link. The bridge can also recognize a message that does not need to be forwarded, because the source and destination stations are both reached through the same link. Except for its function of "learning" station locations, or at least station directions, the bridge operates basically as a message repeater.

As network topologies become more complex, with large numbers of LANs, and multiple bridges interconnecting them, operational difficulties can ensue if all possible LAN bridging connections are permitted. In particular, if several LANs are connected by bridges to form a closed loop, a message may be circulated back to the LAN from which it was originally transmitted, and multiple copies of the same message will be generated. In the worst case, messages will be duplicated to such a degree that the networks will be effectively clogged with these messages and unable to operate at all.

To prevent the formation of closed loops in bridged networks, IEEE draft publication P802.1D, referred to above, proposes a standard for a spanning tree algorithm that will connect the bridged network into a tree configuration, containing no closed loops, and spanning the entire network configuration. The spanning tree algorithm is executed periodically by the bridges on the interconnected network, to ensure that the tree structure is maintained, even if the physical configuration of the network changes. Basically, the bridges execute the spanning tree algorithm by sending special messages to each other to establish the identity of a "root" bridge. The root bridge is selected, for convenience, as the one with the smallest numerical identification. The algorithm determines which links of the bridges are to be active and which are to be inactive, i.e., disabled, in configuring the tree structure. One more piece of terminology is needed to understand how the algorithm operates. Each LAN has a "designated" link, which means that one of the links connectable to the LAN is designated to carry traffic toward and away from the root bridge. The basis for this decision is similar to the basis for selecting the root bridge. The designated link is the one providing the least costly (shortest) path to the root bridge, with numerical bridge identification being used as a tie-breaker. Once the designated links are identified, the algorithm chooses two types of links to be activated or closed: first, for each LAN its designated link is chosen, and second, for each bridge a link that forms the "best path" to the root bridge is chosen, i.e., a link through which the bridge received a message giving the identity of the root bridge. All other links are inactivated. Execution of the algorithm results in interconnection of the LANs and bridges in a tree structure, i.e., one having no closed loops.

Internet is a collection of networks, including Arpanet, NSFnet, regional networks such as NYsernet, local networks at a number of university and research institutions, and a number of military networks. The protocols generally referred to as TCP/IP were originally developed for use only through Arpanet and have subsequently become widely used in the industry. The protocols provide a set of services that permit users to communicate with each other across the entire Internet. The specific services that these protocols provide are not important to the present invention, but include file transfer, remote log-in, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

TCP/IP frequently uses a slight deviation from the seven-layer OSI model in that it may have five layers. These five layers are combinations and derivatives of the seven-layer model as shown in FIG. 1. The five layers are as follows:

Layer 5—The Application Layer. Applications such as ftp, telnet, SMTP, and NFS relate to this layer.

Layer 4—The Transport Layer. In this layer, TCP and UDP add transport data to the packet and pass it to layer 3.

Layer 3—The Internet Layer. When an action is initiated on a local host (or initiating host) that is to be performed or responded to on a remote host (or receiving host), this layer takes the package from layer 4 and adds IP information before passing it to layer 2.

Layer 2—The Network Interface Layer. This is the network device as the host, or local computer, sees it and it is through this medium that the data is passed to layer 1.

Layer 1—The Physical Layer. This is literally the Ethernet or Serial Line Interface Protocol (SLIP) itself.

At the receiving host the layers are stripped one at a time, and their information is passed to the next highest level until it again reaches the application level. If a gateway exists between the initiating and receiving hosts, the gateway takes the packet from the physical layer, passes it through a data link to the IP physical layer to continue, as is shown in FIG. 2. As a message is sent from the first host to the second, gateways pass the packet along by stripping off lower layers, readdressing the lower layer, and then passing the packet toward its final destination.

A router, like a bridge, is a device connected to two or more LANs. Unlike a bridge, however, a router operates at the network layer level, instead of the data link layer level. Addressing at the network layer level makes use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and are globally unique, i.e., no two hosts, wherever located, have the same data link layer address. There is a protocol called ARP (address resolution protocol), which obtains a data link layer address from the corresponding network layer address (the address that IP uses). Typically, each router maintains a database table from which it can look up the data link layer address, but if a destination host is not in this ARP database, the router can transmit an ARP request. This message basically means: "will the host with the following network layer address please supply its data link layer address." Only the addressed destination host responds, and the router is then able to insert the correct data link layer address into the message being forwarded, and to transmit the message to its final destination.

IP routing specifies that IP datagrams travel through internetworks one hop at a time (next hop routing) based on the destination address in the IP header. The entire route is not known at the outset of the journey. Instead, at each stop, the next destination (or next hop) is calculated by matching the destination address within the datagram's IP header with an entry in the current node's (typically but not always a router) routing table.

Each node's involvement in the routing process consists only of forwarding packets based on internal information resident in the router, regardless of whether the packets get to their final destination. To extend this explanation a step further, IP routing does not alter the original datagram. In particular, the datagram source and destination addresses remain unaltered. The IP header always specifies the IP address of the original source and the IP address of the ultimate destination.

When IP executes the routing algorithm it computes a new address, the IP address of the machine/router to which the datagram should be sent next. This algorithm uses the information from the routing table entries, as well as any cached information local to the router. This new address is most likely the address of another router/gateway. If the datagram can be delivered directly (the destination network is directly attached to the current host) the new address will be the same as the destination address in the IP header.

The next hop address defined by the method above is not stored in the IP datagram. There is no reserved space to hold it and it is not "stored" at all. After executing the routing algorithm (the algorithm is specific to the vendor/platform) to define the next hop address to the final destination. The IP protocol software passes the datagram and the next hop address to the network interface software responsible for the physical network over which the datagram must now be sent.

The network interface software binds the next hop address to a physical address (this physical address is discovered via address resolution protocols (ARP, RARP, etc.), forms a frame (Ethernet, SMDS, FDDI, etc. —OSI layer 2 physical address) using the physical address, places the datagram in the data portion of the frame, and sends the result out over the physical network interface through which the next hop gateway is reached. The next gateway receives the datagram and the foregoing process is repeated.

In addition, the IP does not provide for error reporting back to the source when routing anomalies occur. This task is left to another Internet protocol, the Internet Control Message Protocol (ICMP).

A router will perform protocol translation. One example is at layers 1 and 2. If the datagram arrives via an Ethernet interface and is destined to exit on a serial line, for example, the router will strip off the Ethernet header and trailer, and substitute the appropriate header and trailer for the specific network media, such as SMDS, by way of example.

A route policy may be used instead of routing table entries to derive the next hop address. In the system and methodology of the present invention, the source address is tested to see in which ISP address range it falls. Once the ISP address range is determined the packet is then routed to the next hop address associated with the specific ISP.

Data communications network services have two categories of call establishment procedures: connection-oriented and connectionless.

Connection-oriented network services require that users establish a single distinct virtual circuit before the data can be transmitted. This circuit then defines a fixed path through the network that all traffic follows during the session. Several packet switching services are connection-oriented, notably X.25 and Frame Relay. X.25 is the slower of the services, but has built-in error correction —enough for its performance not to depend on clean, high-quality optical fiber lines. Frame relay, regarded as the first generation of fast packet technology, is well-suited for high-speed burst data communication applications.

Connectionless network services, by contrast, let each packet of a communications session take a different, independent path through the network. One example is the Switched Multimegabit Data Service (SMDS), a possible precursor to broadband ISDN. This fast-packet service supports data rates ranging from the T1 rate of 1.544 Mb/s up to 1 Gb/s. The SMDS transport system architecture is defined by IEEE 802.6 Metropolitan Area Network standards.

SMDS supports LAN interconnection and allows the transfer of large, variable length service data units (SDUs). Like frame relay, SMDS allows the user to connect multiple remote routers without having to employ a mesh network. However, as compared to frame relay, SMDS affords a number of advantages. Among these are that it is a connectionless service better suited for LAN traffic, it supports higher access rates and throughput for evolving applications (DS3 and SONET), it supports higher burstiness, and SMDI's cell relay technology implies that it will migrate smoothly to BISDN.

The process of routing packets over the Internet is also considered a connectionless network service. The Internet Protocol (IP) addresses packets from sender to receiver. It is still used mostly in conjunction with the Transmission Control Protocol (TCP), which establishes a connection between end users to manage the traffic flow and ensures the data are correct, providing end-to-end reliability. The combination, known as TCP/IP, is the Internet's main backbone protocol suite.

Asynchronous transfer mode (ATM) is a connection-oriented network service. It is a high-bandwidth, fast-packet switching and multiplexing technique that segments packets into 53-byte cells. It supports sound (voice and audio), data, documents (text, graphics and still images), and video (moving pictures with sound). ATM and SDH/SONET are key technologies enabling broadband ISDN.

The Problem

The Internet has outgrown its academic origins to become a working version of the global information infrastructure and use of the Internet Protocol (IP) has become widespread. A broad spectrum of companies are indicating an interest and belief in the Internet's potential for a wide variety of services and are desirous of using IP for internetwork communication. An almost limitless scope of data exchange is under current investigation for transfer between varying types of LANs, MANs (metropolitan area networks) and WANs using both connection oriented and connectionless procedures of numerous types. Each procedure has its advocates and perceived advantages and disadvantages, and is currently in use to at least some extent. In this evolutionary stage there is a need for a cost effective IP transport system that can accommodate these plural procedures and approaches on a widespread geographic basis. An additional aspect of this problem is the fact that the World Wide Web is growing at an exponential rate and usage of the Internet is believed to be increasing commensurately. This taxes existing facilities and produces the prospect of system overload and/or breakdown with potentially serious if not disastrous consequences. Proactive preventive strategies and preventive measures present a pressing need.

In addition, if subscriber customer numbers are receiving an overload of calls it would be highly advantageous to be able to redirect a series of numbers to alternate numbers and locations which are not then experiencing an overload. Conventional call forwarding on a line by line basis severely limits the ability of a business operating a large number of lines to effect a large scale redirection within acceptable time and economy limitations.

Prior Art

Perlman et al. U.S. Pat. No. 5,309,437 issued May 3, 1994, entitled "Bridge-Like Internet Protocol Router". The patent pertains to local area networks (LANs) of computers and to multiple LANs that are interconnected by bridges and routers. The patent is directed to a problem that arises in interconnected networks using the TCP/IP protocols. A bridge is defined as a device that connects at least two LANs and serves to pass message frames or packets between LANs so that a source station on one LAN can transmit data to a destination station on another LAN without concern for the location of the destination. A router is defined in the patent as a device connected to two or more LANs that operates at the network level layer. A data link layer address is needed to complete forwarding a message to the destination host after the message reaches its destination network. ARP (address resolution protocol) obtains a data link layer address from the corresponding network layer address. ARP messages are said to cause problems when bridges are used within an extended network of LANs. ARP packets can be duplicated by bridges and this can result in "flurries" of ARP packets which can disrupt normal traffic flow.

The patent proposes the solution of using a bridge-like IP router called a BLIP. This functions like a bridge for non-TCP/IP traffic and functions in a bridge-like manner for TCP/IP traffic. It functions like a bridge at the network layer level of addressing.

The method of the patent includes configuring an extended local area network (LAN) to include a plurality of extended LAN segments connected to bridge-like IP routers (BLIPs). These receive a packet of data at a BLIP and determine whether the packet has been transmitted under TCP/IP protocols. Non-TCP/IP packets are processed in the manner of a conventional bridge and TCP/IP traffic is processed in a manner analogous to a bridge.

Baudoin U.S. Pat. No. 5,406,557 issued on Apr. 11, 1995, is entitled "Interenterprise Electronic Mail Hub". The patent relates to electronic mail on wide area networks and includes multiple incompatible electronic mail applications. The patent deals primarily with the transmission of E-Mail and enables users located in different locales to use different E-Mail Protocols.

The patent utilizes an electronic communication center (ECC) that serves as a hub for routing messages. The ECC has a message queue, a queue management system, an address table and a plurality of translation modules. The ECC converts all incoming E-Mail messages to a non-user specific standard protocol. Then, based upon the destination address, the ECC converts the nonstandard protocol to the appropriate protocol for each destination user. FIG. 1 illustrates an embodiment of the invention. In that figure the block 2 represents an enterprise which includes various internal entities 4, 6, 8, and 10 connected to users located outside of enterprise 2. This communication equipment connects to a communications hub 14 which may be a mainframe or mini-computer. Hub 14 contains a plurality of communication modules useful for interfacing with individual pieces of communications equipment.

Each piece of communication equipment internal to enterprise 2 connects to one of the internal communication modules 16. Network interfaces and communication equipment external to enterprise 2 connect to one of the external communication modules 18. Thus, hub 14 is divided into two halves, an internal communication half 14a and an external communication half 14b. The internal communications module 16 converts messages and information data between a "universal" format and protocol internal to hub 14 and the protocol and format used by the associated piece of communications equipment. Hub 14 look at the destination address for a message received from one of the entities 4, 6 or 10 and routes the message to the appropriate external communication module 18. Module 18 converts the universal format message into the specific message format and protocol required by the end user. For example, module 18a connects to the Internet.

Callon U.S. Pat. No. 5,430,727 issued Jul. 4, 1995. The patent deals with calculating routes for sending user data packets through an interconnected network of information handling devices. It utilizes two protocol suites. One is the OSI-I and the other is the TCP/IP. The patent allows data packets to be forwarded from one local area network to another by a device acting as a router and allows the first protocol suite to act as a bridge rather than a router.

OBJECTS OF THE INVENTION

It is a primary object of the present invention to provide a system and method for meeting the above described need and solving the problem which it presents.

It is another object of the invention to meet this need using plant, facilities and technologies which are individually available to a large extent in the public switched telephone network (PSTN).

It is yet another object of the invention to accomplish the foregoing in a fashion which presents cost advantages to both users and providers of the involved services.

It is another object of the invention to provide such a system and method which will permit customers to be able to access information through a variety of communication facilities offering service at multiple selectable speeds of access and different types of connectivity.

It is a further object of the invention to provide such a system through use of the public switched telephone network using an equal access model and source routing.

It is another object of the invention to provide a public IP transport network wherein single number calling is implemented.

It is another object of the invention to provide a public IP transport network having provision for load redirection under predetermined circumstances.

SUMMARY OF THE INVENTION

In a simplified sense the present invention is directed to providing a common carrier platform and methodology for implementing access to the Internet and related IP data transport service for users or customers employing a wide variety of procedures and intranetwork protocols. The target customers for the service constitute Internet Service Providers (ISPs) as well as intranet users such as small and large corporations who wish to use IP in support of their corporate networks. In this sense the invention involves supplying IP transport service and a Telco maintained and operated IP transport network. In another sense the invention provides Internet access to widespread local areas served by a public switched telephone network. In the latter example a consumer access provider company, which may or may not be Telco owned, may obtain access to Telco customers virtually throughout its operating region. This may be accomplished according to the invention without violation of the currently existing judicial and regulatory proscription of inter-LATA message service by a regional Telco.

Customers may obtain the use of various types of ports on the Telco platform such as, by way of example, analog 28.8 Kb/s service, ISDN service, dedicated ports for SMDS (switched multimegabyte data service), frame relay, T1, DDS or other available services. As a matter of convenience the hubs will be collocated with central office switching systems and oftentimes may be sited in the same building. Each hub and its equipment will be operated, maintained and provisioned by Telco personnel.

The current availability of the Telco SMDS service, with its previously described advantages, makes feasible virtually immediate provision of service to large business customers capable of interfacing via SMDS. This facilitates limitation of the load or traffic on the gateway routers in the hubs inasmuch as the SMDS signals may be bypassed around the router.

A key component of the system is the LATA hub wherein one such hub is provided for each LATA. In one Telco example 19 such LATA hubs are utilized. Dedicated access is offered only from such LATA hubs and will support connectionless services such as frame relay or SMDS, which are currently tariffed fast packet services which are non-distance sensitive. Other presently tariffed services also will be available from these LATA hubs, such as DDS or T1, however these services involve point to point circuits which require additional hardware and are distance sensitive. The system of the invention would allow Internet service provider customers such as UUNet, PSI, and the like, to concentrate on providing service, which is the source of their income, and refrain from investing capital in infrastructure and infrastructure provisioning and maintenance.

The main module of equipment in the hub is the gateway router. The gateway router is connected via redundant links to the Telco LATA SMDS network or "cloud" and thence to the Internet at large. The SMDS links may be 34 Mb/s or T1 links or any combination thereof or of similar links.

The Internet Protocol Routing Service (IPRS) of the invention provides for the collection, concentration and management of the customers traffic within a LATA. IP Routing Service comprises network routers located at LATA hub sites that will collect the customer's (ISP's) end user traffic and concentrate it for connection and transport over a Telco Exchange Access Switched Multi-Megabit Data Service (XASMDS) Subscriber Network Interface. By way of example, the IP routing service may provide six types of ports for the collection of end user traffic. The port type or types are determined by the method chosen by the customer for access to its end users. The six port types may be analog dial-up, Integrated Services Digital Network (ISDN) dial-up, Digital Data Service (DDS), DS1 (Digital Service, level 1), 56 kbps Frame Relay, and 1.544 Mbps (T-1) Frame Relay. The IP Routing Service may use RADIUS (Remote Authentication Dial-in User Service) as a network security protocol, for the customer's (ISP's) authentication and authorization of the ISP's dial-up end users. The reference to six port types is exemplary only and additional port types may be added within the scope of the invention.

Another advantage is that when connections are made under the SMDS cloud it is not necessary to pass that traffic through the gateway router in the cognizant hub to get to the Internet. The customer can peer directly to their Internet carrier of choice, their ISP of choice. If frame relay switches were being used there would not be a direct peer relationship. It would be necessary to pass through a central site router at some point. This would create congestion in the gateway router.

Traffic from a customer's switched access end users passes through the central office switching system with which the mini-hub or the LATA hub is collocated. This traffic passes from the central office switch to communication access servers (sometimes referred to herein as access servers or network access servers or NASs) and thence to an Ethernet packet switch in the hub. The access servers perform on a more limited scale the same functionality as the gateway router. Thus the access servers deliver the physical PRI on the central office switch side as 10baseT to the Ethernet switch, the translation having occurred in the access server. The access servers handle either POTS (Plain Old Telephone Service) or ISDN (Integrated Service Digital Network) signals. From the Ethernet switch performs further concentration and switching to a 100baseT link to the gateway router. The gateway router in turn acts as an IP packet switch and routes the traffic to the SMDS network or cloud. The gateway router performs the same packet switch function to route SMDS to frame relay or to route Ethernet to frame relay or the converse.

It is an important feature of the invention that source routing may be implemented.

Each LATA hub and each mini-hub has an administrative router to provide for maintenance. It is a further feature of the invention that a maintenance backbone network is provided to troubleshoot and maintain the entire network. The administrative router has access to all of the different modules of equipment in the hub and network both through the SMDS network as well as through a frame relay overlay network to a central Telco maintenance center. The frame relay cloud serves as a maintenance backbone network and traverses all 80 hub sites in this example. Inasmuch as this performs a management function the communication across LATA boundaries is permissible under applicable regulations. According to the invention the operation of the entire network is monitored using SNMP (simplified network management protocol). When trouble is detected via the SMDS network, this is further analyzed using the frame relay backup network. Correction is effected through the frame relay network.

The maintenance center includes a server or router and a group of terminals providing interfaces to the SMDS and frame relay networks. A technician at a terminal at the maintenance site may control trouble shooting and provide centralized maintenance of the entire IPRS network. The overlay network is used to provide automated management and maintenance functions beyond routine monitoring. The frame relay network is entirely private and provides secure addressing and levels of security not readily available via the main SMDS cloud. Whereas certain monitoring occurs via SNMP this constitutes a read only feature. The write function is reserved for the private frame relay network.

In utilizing the service and system of the invention a customer such as an Internet access provider, by way of example, who provides service in numerous calling areas, will have a subscription to a large number of LATA hubs, and a plurality of telephone numbers equal to the number of hubs which are subscribed. It is a feature of the invention that the PSTN may provide to such a subscriber a single number access service and thereby eliminate the need for such multiple directory numbers. According to one feature of the invention this is accomplished by utilizing an advanced intelligent network (AIN) overlay with the basic network. With this arrangement the identity of a station calling the single numbers is determined, a data base is accessed to match this station with a geographical location, a second data base is accessed to match the location to the number of the ISP subscriber node port serving that geographical area, and the call is then routed to the node port number which was obtained.

According to another feature of the invention a subscriber is provided with an effective mechanism for not only reacting to but also proactively anticipating and ameliorating or preventing network overload. This is accomplished at least in part, by providing redirection as a network feature, rather than as a switch feature. In accordance with this aspect of the invention, Advanced Intelligent Network (AIN) platforms include data bases populated with information about all subscriber phone numbers within the network. A large number of telephone lines may concurrently be prespecified in a data base by the subscriber, together with alternate telephone number destinations corresponding to the telephone lines, for redirection.

Redirection set up for all of the subscriber's lines may be accomplished by a single data entry operation into the data base in accordance with a template or table of designations customized by the subscriber. Redirection information may be transmitted by telecommunication line to an adjunct processing device associated with the AIN data base. Such information may specifically identify a portion, if not all, of the subscriber's lines. Each specified line may be associated with one or more redirected destinations. Alternatively, groups of specified lines may be designated for such alternative destinations. Subscriber line alternative destinations may be designated for a given time period, with a preset percentage apportionment of incoming calls to each destination. Several schedules may be input to the data base, with each schedule containing prespecified redirection information for itemized time periods. A subscriber may select between stored schedules, to activate a redirection schedule, simply by dialing into an adjunct processing device.

Future incoming calls to any of the prespecified telephone lines will be redirected to the corresponding destinations, as prespecified, by means of common channel signaling. If a call is to be redirected, a flag is set in the signaling network. The flag may act as a terminating trigger if placed at a service switching point (SSP) associated with the destination central office, or as an initiating trigger if placed at a signal transfer point (STP). No seizure of a trunk voice line path to the central office or switch of the dialed telephone line number will occur if the call is to be redirected to a different central office or switch. Therefore calls, rather than being forwarded, are redirected before line seizure.

It will be appreciated from this summary that the invention represents a significant advance in the field of providing transport of Internet Protocol (IP) using facilities available in the public switched telephone network. The capability is not limited to Internet access but also provides intercommunication between multiple LAN and WAN segments. In the Internet context the invention provides an opportunity for cost effective expansion for diverse communication and information providers. Other aspects and advantages of the invention will become apparent from the following more detailed description, taken in conjunction with the accompanying drawings.

BRIEF DESCRIPTION OF THE DRAWINGS

FIG. 14 is a flow chart showing a routine for a call redirected from a destination location associated with a first central office to an alternative destination associated with a second central office, in accordance with the invention as shown in the embodiment of FIG. 13.

FIGS. 15A, 15B, and 15C are charts showing examples of a redirection set up in accordance with the invention.

DESCRIPTION OF THE PREFERRED EMBODIMENT

Figure 3:
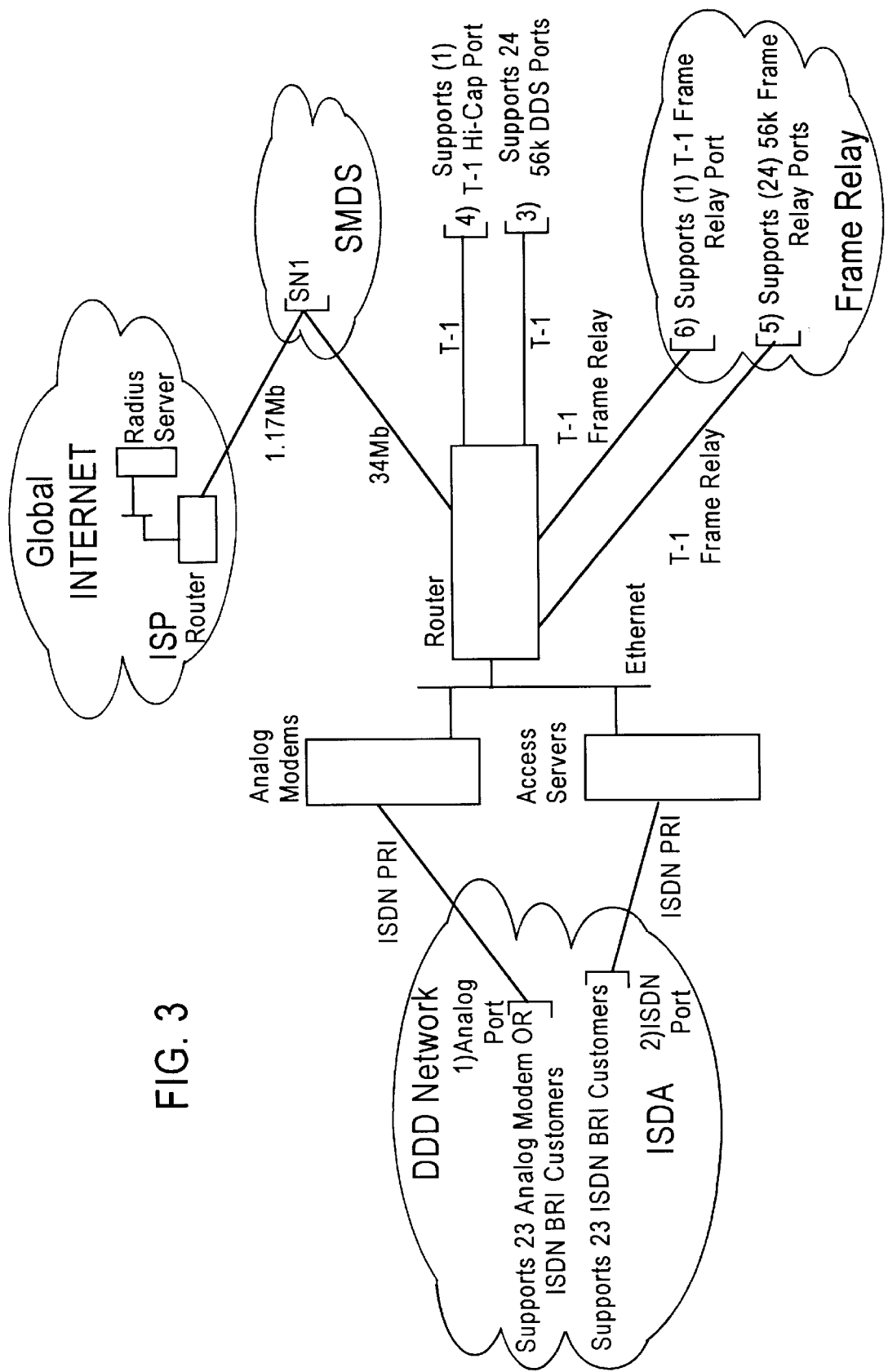
FIG. 3 is a simplified high level functional diagram of the Internet Protocol Routing Service (IPRS) network of the invention showing a typical hub configuration.

Referring to FIG. 3 there is shown a functional depiction of an Internet Protocol Routing Service network according to one preferred embodiment of the invention. A public switched telephone network (PSTN) is shown as a PSTN cloud. Within the PSTN are a switched dial-up analog port (1) and a switched dial-up ISDN port (2). These are connected from an end office switch in the PSTN by ISDN PRI links to analog modems for the dial-up calls which originate as analog, and to access servers for the dial-up calls which are initiated as ISDN calls. The analog port supports 23 analog initiated calls, while the ISDN port supports 23 ISDN BRI dial-up calls.

The modems and access servers are connected to an Ethernet which terminates in a Router. The router is also connected by T-1 links to a Frame Relay network shown as a cloud. These Frame Relay links may be connected respectively to 24 56 k Frame Relay ports (5), and to a T-1 Frame Relay port (6). The Router is further connected by T-1 links to a T-1 high capacity (Hi-Cap) port (4), and to 24 56 k DDS ports (3), respectively. The Router feeds the SMDS network, shown as a cloud, via a 34 Mb link, and the SMDS network feeds one or more customer or ISP routers in the Global Internet. This latter feed may be via a 1.17 Mb link. The ISP router may be coupled to a RADIUS server for remote authentication purposes.

Figure 4:
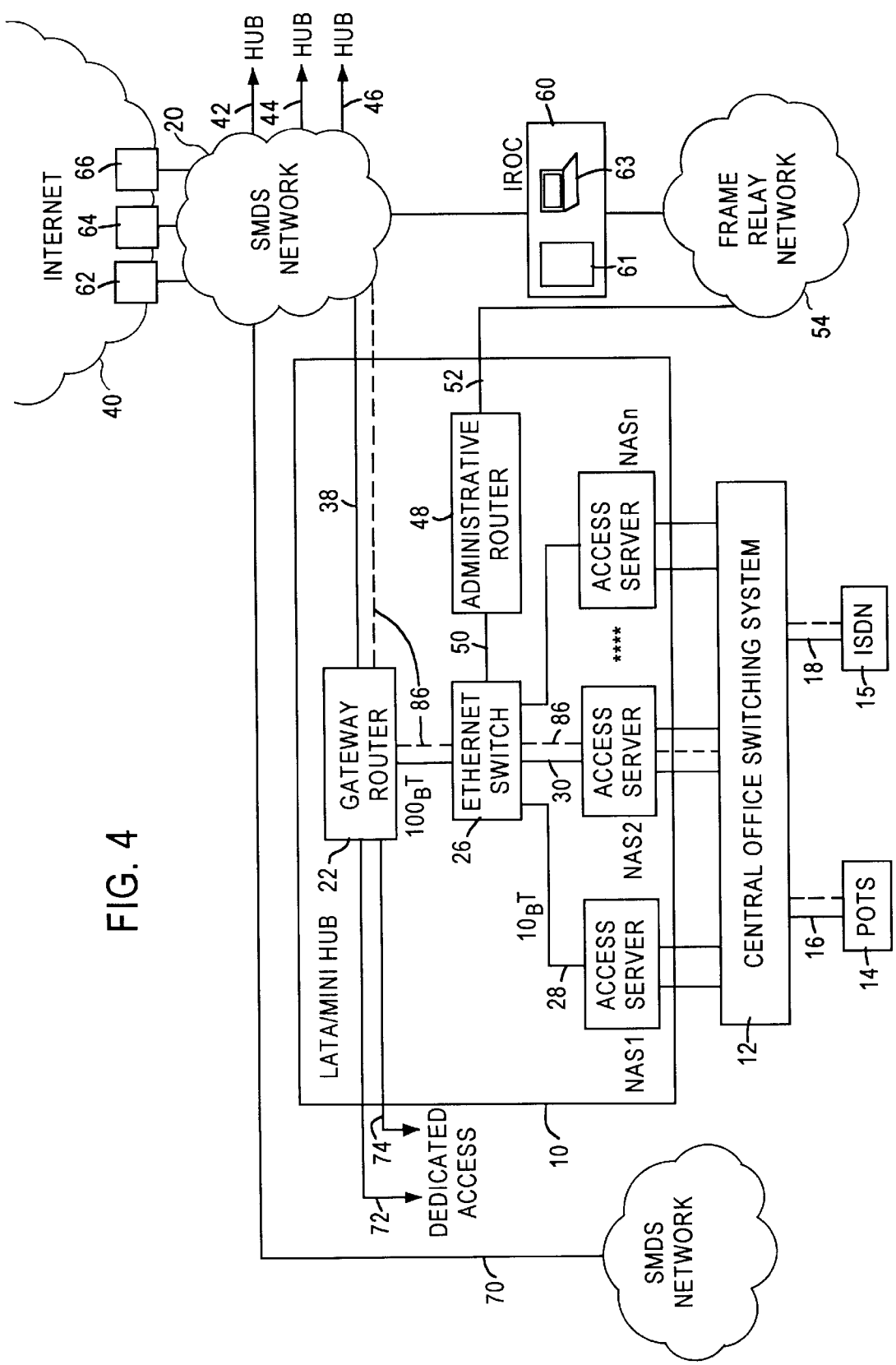
FIG. 4 is a simplified block diagram of the architecture of one preferred embodiment of the public IP transport network of the invention.

Referring to FIG. 4 there is shown in more detail a simplified architectural depiction of the preferred embodiment of the invention of FIG. 3. FIG. 4 may be considered as showing in simplified form the portion of the system which may be found in one LATA of a regional operating telephone company. At 10 there is indicated a LATA/mini-hub which is collocated with a central office switching system or end office switch 12. The central office switch is a program controlled switch such as the 5ESS switch manufactured by AT&T, DMS 100 switch manufactured by Northern Telecom, or an equivalent switch from another manufacturer.

The central office switch is connected by local loops to the premises in the area which it services, here illustratively indicated by the premises 14 and 15. The local loops may comprise twisted pairs 16, as in the case of the premises 14, or an ISDN BRI link 18 in the case of the premises 15. It will be understood by those skilled in the art that this will constitute a large number of premises which may be both residential and business in nature.

Figure 1:
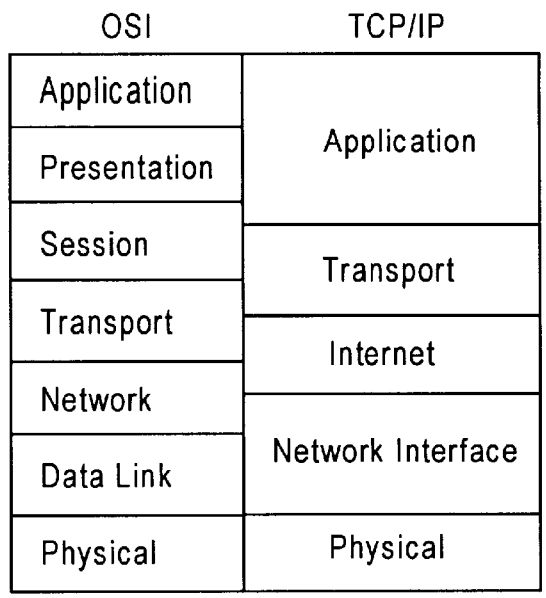
FIG. 1 is a comparative diagram of the International Standards Organization (ISO) Open System Interconnection (OSI) model for network architectures and a commonly used TCP/IP model.
Figure 2:
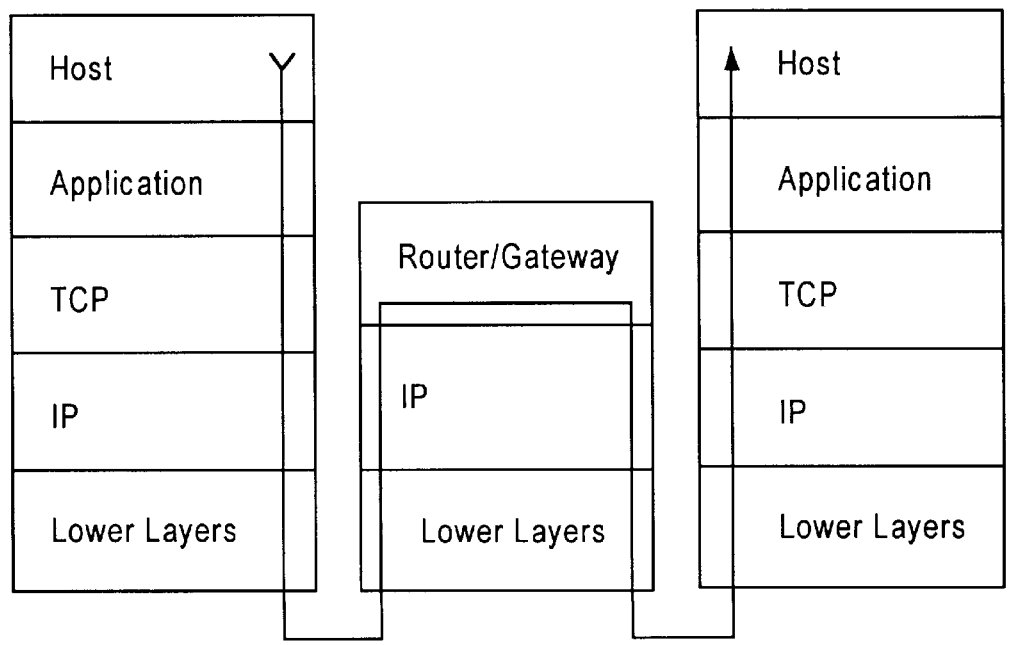
FIG. 2 is a simplified block diagram illustrating the passage of a packet from an initiating host to a receiving host through a gateway.

The occupants of the premises, who are customers of the ISPs, may be characterized as end users. LATA/mini-hubs will be collocated with central office switching systems that serve a predetermined minimum number of end users, such as, for example, 50,000 end users per switching system. The regional operating telephone company or public switched telephone network (PSTN) which includes the central office switching system 12 also includes an SMDS network here indicated pictorially by the SMDS cloud 20. It will be understood that the central office switching systems 12 are connected together by the usual trunks, central office switching systems, tandem switches, and common channel interoffice switching system (CCIS) and Advanced Intelligent Network (AIN), which are not shown in FIG. 1.

The LATA/mini-hub 10 includes a gateway router 22, which is connected by a 100baseT link 24 to an Ethernet packet switch 26. The gateway router 22 serves as the basic gateway to the infrastructure of the system. In practice it may be of the type marketed by Cisco Systems, Inc., of San Jose, Calif., as the Cisco 7500 Series router. The Ethernet packet switch in turn is connected by 10baseT links 28, 30, and 32 to a series of communication access servers, access servers, or NASs, NAS1, NAS2, NASn. The access servers perform on a more limited scale the same functionality as the gateway router and handle either analog or ISDN initiated signals on the central office side. Thus the access servers are shown linked to the central office switch 12 by PRIs 34-1 through 34-n. The gateway router 22 is connected by a link 38 to the SMDS network cloud 20. The SMDS network 20 is connected by links 42, 44 and 46 to additional hubs in the LATA. Each LATA is provided with one hub which acts as a LATA hub whereas the remaining hubs in the LATA serve as mini-hubs for that LATA, for purposes presently to be described. The hubs are substantially identical in construction.

The LATA/mini-hub 10 includes an administrative router 48 connected to the Ethernet packet switch 26 by link 50. According to the invention the operating telephone company provides a maintenance backbone network in the form of a frame relay network 54 which is depicted as a Frame Relay cloud. The administrative router 48 is connected to the administrative frame relay network through the link 56, which may be a 56 K or higher link.

The Ethernet switch 26 aggregates the switched access traffic, i.e., the dial-up traffic from the switch 12. The gateway router 22 translates the Ethernet traffic to SMDS delivered to and from the link 38 to the SMDS network 20. The gateway router also serves a similar routing and translating functionality in going from SMDS to frame relay or from Ethernet to frame relay, as will be explained in further detail. The gateway router takes the aggregate of any one specific media and performs the protocol conversion, the network layer protocol conversion, and then performs the routing that switches the packets into the appropriate media. As previously stated, the access servers NAS1–NASn provide a similar functionality narrowed to more specific requirements. The access server may comprise, by way of example, a product manufactured by Cisco Systems, Inc., of San Jose, Calif., as the AS5200. The access servers perform a network access server function and are thus designated in FIGS. 4 and 5 as network access servers or NASs.

The administrative frame relay network or cloud 54 is connected to a central maintenance center which may be called an Internet Regional Operations Center (IROC) shown at 60. The IROC is also connected to the SMDS network 20. The IROC is provided with a server or router 61 and a terminal 62 such as a PC from which a technician may control troubleshooting and provide centralized maintenance of the entire ISP network. It is a feature of the invention that this maintenance backbone Frame Relay network is provided to troubleshoot and maintain the entire IP or IPRS transport network. The administrative router has access to all of the different modules of equipment in the hubs both through the SMDS network as well as through the Frame Relay overlay network to the IROC. The Frame Relay network 54 traverses all hub sites.

According to the invention the operation of the entire IP transport network is monitored using simplified network management protocol (SNMP). When trouble is detected it is analyzed using the Frame Relay back-up network and correction is effected through that network. The maintenance center includes a server and a group of terminals providing interfaces to SMDS and Frame Relay. The overlay Frame Relay network is used to provide automated management and maintenance functions beyond routine monitoring. This network may be maintained entirely private and provides secure addressing and levels of security not available via the main SMDS network.

The SMDS network 20 is connected to customers, normally ISPs, indicated at 62, 64 and 66, within a Global Internet cloud 40. Such customers would normally constitute Internet service providers such as UUNet, PSI, Aegis, etc. Such ISPs could also include a service operated and maintained by a Telco in compliance with equal access requirements.

Dedicated access to the public IP transport network is provided at LATA hubs. SMDS dedicated access is connected direct to the SMDS network or cloud 20, as indicated at 70 in FIG. 4, bypassing the LATA hub 10. On the other hand the SMDS dedicated access may be connected to the LATA hub as a connection point while bypassing its operation. This reduces the traffic load on the hub. Frame relay, DDS, T1 and other grades of access are connected directly to the gateway router 22 as illustratively indicated at 72 and 74.

Figure 5:
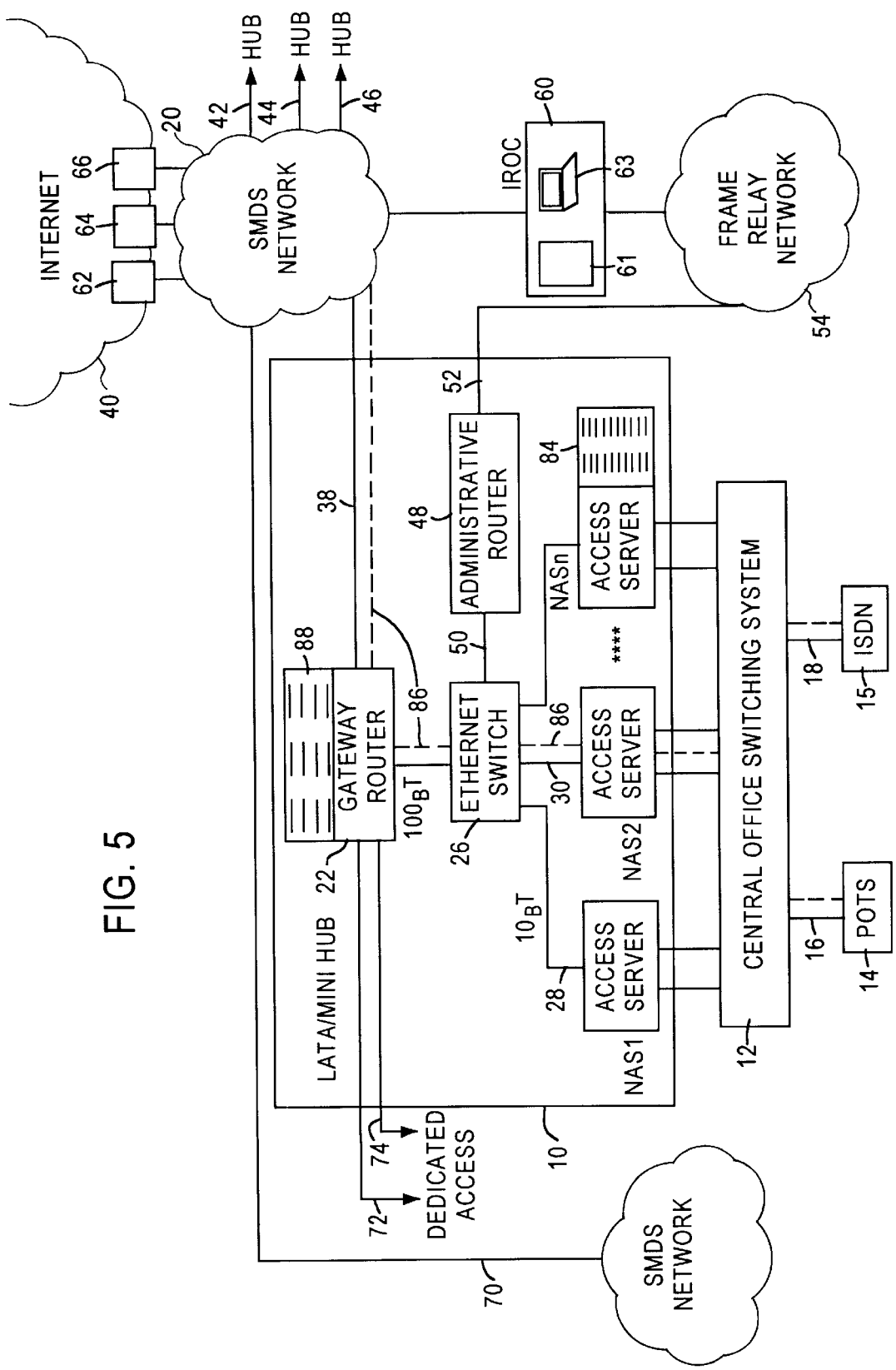
FIG. 5 is a simplified block diagram of the network of FIG. 4 supplemented with additional detail and functional depiction.

Referring to FIG. 5 there is shown a more detailed version of the system in FIG. 4. Similar reference numerals are utilized in FIG. 5 to indicate the same elements as in FIG. 4.

Each access server or NAS in the hub performs a function called Network Access Server function or NAS function. To this end each access server is provided with a table which includes IP address pools, indicated graphically at 84. Each IP address pool contains a range of IP addresses associated with a particular ISP customer 62–66 connected to the SMDS network 20. When an end user call is received an authentication process is initiated regardless of the type of call. When the PPP (point-to-point protocol) connection is brought up a link control protocol (LCP) is initiated and executes an authentication protocol. When the customer initially sets up a TCP/IP stack one of the elements installed is a log-in ID and password. However, this is accomplished in an initial entry and is not brought up in each live use session. This authentication is in the LCP layer and is automated. Once established it automatically executes transparently for each use. The procedure is sometimes referred to as PAP/CAAP (Packet Level Procedure/Call Appearance Level Procedure).

At the start of each session there is a negotiation for a PPP connection which establishes the TCP/IP session. This passes along the access protocol, the login, and the password, which are installed in the customer software. As this is passed along to the network access server software, communication is established through the access server, the Ethernet packet switch 26, the gateway router 22, and the SMDS network or cloud 20 to the customer or ISP. This signal path is indicated in FIG. 5 by the broken line 86. Authentication then occurs, i.e., the user ID is passed along, a table is interrogated in the authentication server, where the ID is identified as a valid account, and the password is verified. From that authentication an IP address is authorized for issuance and is issued.

The IP address is associated with the pool of data information 84 in the access server or NAS. Assuming that each end user at a premise 14 or 15 has a preselected long distance ISP provider having its own access pool, this procedure results in the selection of the predesignated address pool.

An ISP may have established a relationship with one or more IP traffic carriers, such as Aegis, Digital Express, or the like. The ISP may also have selected an Interexchange Carrier (IXC), such as AT&T, for example. The customer ISPs are provided pools of addresses based on the identity of the interexchange carriers and IP carriers selected. The IP pool 84 thus contains multiple address pools for multiple carriers. On an individual call the ISP server may direct the access server or NAS to provide an address from an Aegis pool, by way of example.

The address changes for each call but is selected from the predesignated pool of addresses. Once an IP address is issued the accounting record starts and a start time, start record is generated. From that point the signal is routed out across the access server NAS through the Ethernet packet switch 26 to the gateway router 22 where the second element of the equal access process is effectuated. This is here referred to as "route policy" or RP. The gateway router is provided with a route policy table indicated illustratively at 88. That table shows a range of address space associated with a next hop IP address for the ISP for the caller's primary interexchange carrier or PIC. Any subscriber to the ISP service has the opportunity to select his own primary interexchange carrier or PIC.

The router inspects each incoming packet, determines the originating IP address, uses the IP address to access the table of policy, and from that look-up associates it to the IP address of the IP's gateway router. The router then routes the packets to the next hop address in the absence of being pre-designated to a specific ISP. The next hop destination is thus the default address associated with the ISP gateway router. Equal access consists of two parts, authentication and issuing an IP address out of the pool and then handing this off to the router. The router looks at the originating address received from the pool and based on the originating address, routes to the appropriate ISP or PIC such as, for example, Aegis. Anything coming in on the Ethernet 100baseT port is processed using this route policy. That policy dictates translating the source address into the next hop address for the signal's PIC.

It should be understood that for customers such as Aegis, the equal access policy is inapplicable, and standard routing may be utilized. However, in the case of a Telco ISP it is currently necessary to comply with equal access strictures. The gateway router is programmed to recognize this fact and to route accordingly. It will thus be seen that source routing is utilized in two respects, i.e., in regards to the grade of service made available and also in regards to the selection of an ISP or PIC.

In the equal access PSTN service described above a customer such as an Internet access provider by way of example, who has a subscription to a large number of LATA hubs, will have a plurality of telephone numbers equal to the number of hub ports which are subscribed. This may be equal to the number of subscribed LATAs but may be larger if the customer also has both analog and ISDN subscriptions or ports. In that event the number of ports will be doubled. It is a feature of this embodiment of the invention that the PSTN may provide to such a subscriber a single number access service which would eliminate the need for multiple directory numbers. By utilizing an advanced intelligent network (AIN) overlay with the network shown in FIGS. 4 and 5 it is possible to provide a customer with single number service.

In an AIN system, central offices having a service switching point (SSP) exchange data messages with an integrated services control point (ISCP) via a switching transfer point (STP). At least some calls are thus controlled through multiple central office switches using data retrieved from a database in the ISCP. A more exhaustive description of an AIN system, suitable for implementation in connection with the present invention, is provided in U.S. Pat. No. 5,247,571 to Kay and McConnell, the disclosure of which is incorporated herein by reference. The Kay and McConnell patent is assigned to the assignee of the present invention.

Figure 6:
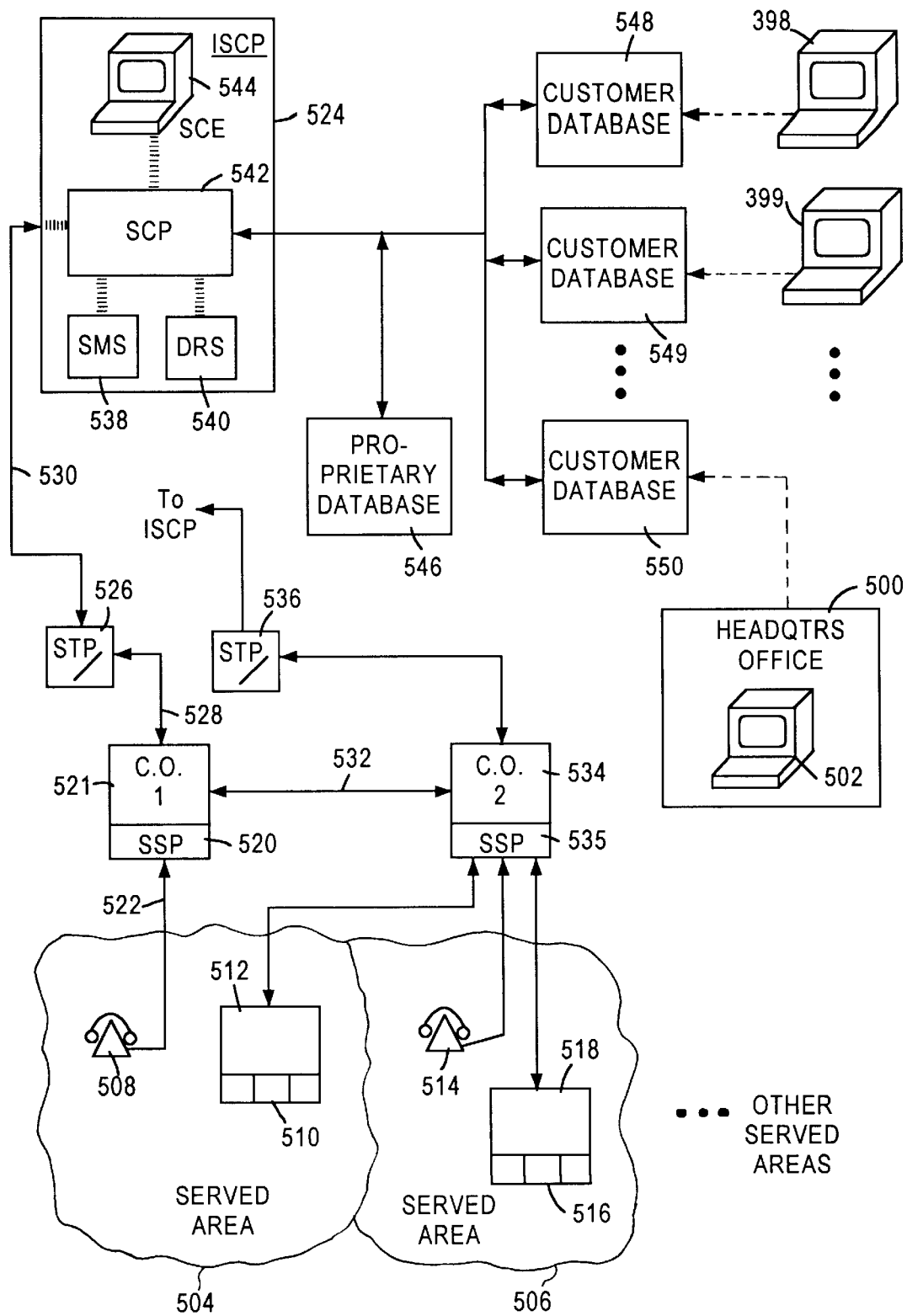
FIG. 6 is a schematic block diagram schematically illustrative of a telephone system including call routing and processing in accordance with another embodiment of the invention.

FIG. 6 is a block diagram of a telephone system including components of an advanced intelligent network and of this embodiment of the invention, which helps to illustrate its structure and operation. It will be recognized, of course, that FIG. 6 is considerably simplified for explanation purposes and that the full network and operating environment for this embodiment of the invention may comprise multiple central offices, diverse interconnections, and provisions for reliability through redundancy, all of which need not be shown for developing an understanding of the invention. A more complete description of a typical AIN network may be found in U.S. Pat. No. 5,475,732 to Eugene M. Pester, III, issued Dec. 12, 1995, entitled "Common Channeling Signaling Network Maintenance and Testing." This patent is also commonly owned with the present application.

Referring to FIG. 6, it may be assumed that a subscriber for Telco transported access to Internet services (such as an ISP by way of example) has an office or facility 500 which includes a graphical processing terminal 502 for use by the subscriber to define territories from which end user telephone or data calls dialed to single or virtual number provided to the subscriber are to be routed to actual, subscriber preselected, telephone numbers. The selection of an actual telephone number to satisfy the equal access purposes of the PSTN pursuant to governmental regulations is not necessarily the sole basis for selection of an actual number. Internet service providers may well have multiple actual telephone numbers which are assigned within a LATA based on the geographical location of the Internet service provider's customers (end users). The function and operation of the graphical processing terminal 502 will be covered in detail in the ensuing discussion. The office or site 500 need have no fixed location, nor is there any absolute requirement that there even be an office. Graphical processor 502 is accessible by the provider customer, or someone, on the provider customer's behalf, for purposes of defining boundaries and setting routing telephone numbers. The graphical processor 502 may be located, for example, in any of the customer defined territories in a LATA and may, in fact, be entirely portable for operation at any convenient location. It is preferably a stand-alone processor, as will be described below, and need have no permanent or continued connection to any other system component.

As illustrated in FIG. 6, the provider customer has various served territories, including contiguous served areas 504, 506, and others as indicated by legend. All of the served areas, taken together, may cover some broad geopolitical area such as a LATA, city, county, state, group of states, or they may cover the entire United States. The served areas need not be contiguous and there may be some served areas which are isolated from others. Generally, a call dialed to the provider customer's single or virtual telephone number from a station such as a computer (not shown) or telephone 508, for example, located in served area 504, will be routed to the port 510 located in network access server or NAS, 512 which is located in a mini hub, such as shown in FIGS. 4 and 5, in the LATA of telephone 508, which is located in area 504. Similarly, a call to the single or virtual number from calling station 514, located in area 506, may be routed to the port 516 located in its network access server or NAS 518, which may or may not be in the same area 506 as the calling station 514. Calls arising in other served areas of the provider customer will similarly be routed to an appointed port, NAS, and mini hub.

A call to the provider customer's single or virtual number from station 508 begins with a party at the calling station 508 dialing that number, usually by autodialing under the control of the customer premise PC being used to access the Internet. The single or virtual number may be the usual 7-digit telephone number, a full 10-digit number including the three NPA digits, or an 800 number. In any case, a Service Switching Point (SSP) 520 located in a first central office 521 receives the dialed digits by way of the local loop 522. The SSP 520, programmed to recognize the virtual number as an action trigger requiring AIN direction for routing, momentarily suspends processing of the call and formulates a query message for that purpose to be sent to the ISCP 524. The query message format and the means of its conveyance to the ISCP 524 are as described in the Kay and McConnell patent, but for present purposes it will include the provider customer's single or virtual number and an indication, such as the automatic number identification (ANI), of the calling station's number. It will also include an indication of call type (here, that the call is placed to a virtual number and that it is analog or ISDN) so that the ISCP has an indication of the treatment the call is to receive.

The message signaling pathway to the ISCP 524 is by way of STP 526, connected on one side by data link 528 to the central office 521, and on the other side to ISCP 524 by data link 530. The ISCP 524, in conjunction with peripheral databases, is operative, as will be described, to determine from the provider customer's virtual number, the calling station's ANI, and the analog or ISDN nature of the call, the actual phone number to reach port 510 in NAS 512. Once determined, that number is returned in an appropriately formatted routing message, by way of STP 526, to the SSP 520 of central office 521. Upon receipt of the routing message, the SSP 520 resumes call processing for the call and it is routed, in this case, via trunking system 532, to a second central office 534 serving ports 510 and 516 located, respectively, in the network access servers or NASs 512 and 518. The second central office 534 delivers the call to port 510.

By similar processing, a call originating at station 514 in the subscriber's territory 506 will be routed to the port 516 in the terminal access server 518. In this latter case, however, since the call is both originated and terminated by the same central office 534 there is no routing from one central office to another. Nevertheless, the ISCP 524 is queried for virtual number routing instructions. Thus, the second central office 534 also includes an SSP 535 and has access to the ISCP 524 through an STP 536 and associated data links for virtual number call routing purposes, even though the call itself is not routed beyond the serving central office 534. As will also be recognized by those of skill in the art, in the event a call is routed from one central office to another, the ISCP 524 may be queried for routing instructions by either the originating or the terminating SSP.

The ISCP 524, comprised of a service management system (SMS) 538, a data and reporting system (DRS) 540, a service control point (SCP) 542, and a service creation environment (SCE) 544 as described in the Kay and McConnell patent. The SCE 544 provides a gateway for initial entry and updating of data pertinent to call routing in accordance with this embodiment of the invention. For what may be regarded as typical AIN applications, the ISCP 524 provides a complete system for carrying out the function of those applications. When operative for the present invention, however, the SCP 542 comprising the ISCP 524 has access to additional databases, including, first, a proprietary database 546, and second, a plurality of customer accessible databases 548–550. The first database 546 is proprietary to the operator of the telephone system, usually a local exchange carrier or LEC. Of the customer accessible databases 548–550, there is one for each virtual number in operation (i.e., usually a database for each virtual number subscriber or each Internet access provider or customer in this example).

Figures 7, 8, 10:
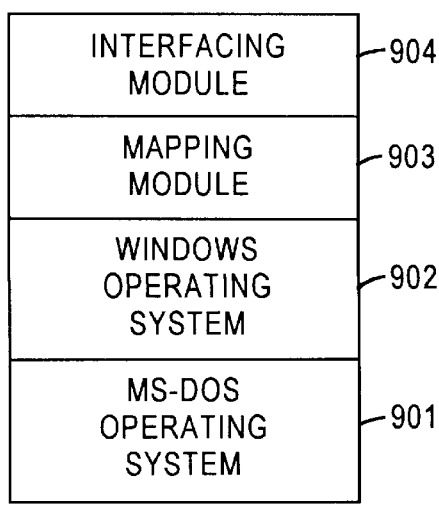
FIG. 7 is a table illustrative of a first common database that relates ANI information with postal zip code information.
FIG. 8 is a table is illustrative of a second database that relates postal zip code information with subscriber destination information.
FIG. 10 is a simplified block diagram of the software architecture for a graphical processing terminal according to the invention.

The contents of the proprietary database 546 is accessible only to the telephone operating company. Its contents include a file relating the telephone number of calling stations (including telephones and related equipment 508, 514, and others) to an indicator of the geographic location of each calling station. The geographic indicator may be the postal zip code of each station's location, and preferably would be its full 9-digit postal zip code so that the geographic location of a calling station is precisely indicated. This information is available from the telephone operating company's business files since it is generally obtained for billing and other purposes when an end user customer signs up for basic telephone service. This relational data for database 546 is loaded and is accessible for other data management purposes, such as file updating, through the SCE 544 and SCP 542. FIG. 7 provides an example of the file contents of the proprietary database 546.

The provider customer accessible databases 548–550 are preferably provided and maintained by the telephone operating company, but they are each accessible by the provider customer, or provider subscriber, so that data can be entered and altered as required to create customized call routing plans, or tables, for the virtual number to which the particular database relates. For that purpose, each provider customer or subscriber may have available a graphical processing terminal to create the data that gets loaded into the respective customer databases. Office 500 terminal 502 is associated with customer database 550, and terminals 398 and 399 are associated, respectively, with customer databases 548 and 549. The data content is essentially in the form of a table, for the particular virtual number, that relates geographical indicators from the proprietary database to actual telephone numbers of ports in the NASs in the mini hubs. Thus the table relates a calling station's 9-digit postal zip code to a mini hub and terminal access server and port therein. Effectively, by determining the relationship between zip codes and actual telephone numbers, the provider subscriber is able to set boundaries for territories to be served by various mini terminal access servers and ports. FIG. 8 is an example of the file contents of a provider customer accessible database.

In operation, whenever the ISCP 524 receives a virtual number routing query message from a central office, which number is assigned to a provider subscriber, the SCP 542 accesses the proprietary Telco database 546 with the directory number of the calling station (the ANI) and retrieves the corresponding 9-digit zip code. Using the provider customer or subscriber's virtual number, the customer database that contains the routing plan for that virtual number is then accessed from one of databases 548–550, and the 9-digit zip code is cross-referenced to the corresponding actual telephone number for the correct port. By this arrangement, the proprietary first database 546 serves as a common reference point for access to any number of virtual number databases 548–550, each available to a provider customer or subscriber for independently customizing its own routing plans as desired for their particular service. All of these draw upon the relatively static content of the first database while providing the dynamics needed for customization through the second databases.

Figure 9:
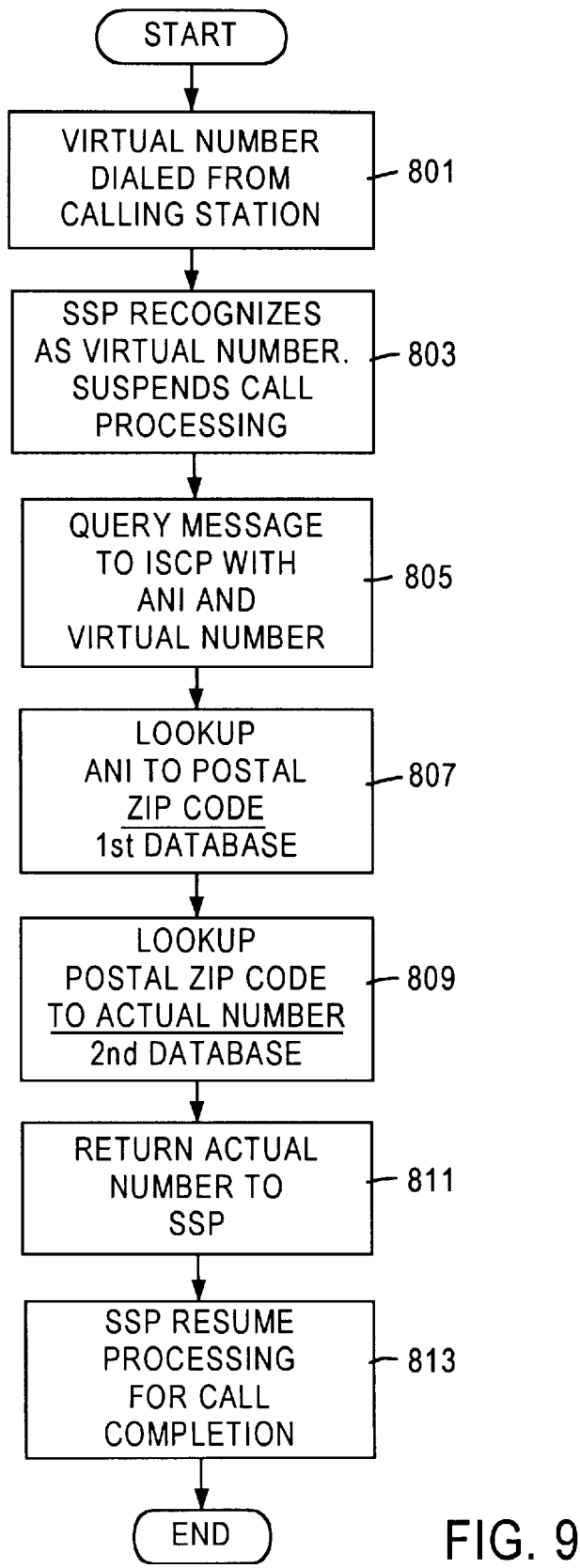
FIG. 9 is a simplified block flow chart exemplifying the processing steps for call routing in accordance with the invention.

The flow chart of FIG. 9, considered with FIG. 6, outlines the overall call processing steps. Initially, at step 801 the calling station, station 508, goes off-hook and the virtual telephone number is dialed from that station. The SSP 520 in central office 521 recognizes from the dialed digits, in step 803, that the call is to a virtual telephone number and, therefore, that the ISCP 524 must be consulted for routing instructions. This action trigger causes the SSP 520 to momentarily suspend its processing of the call, and, at step 805, to formulate and send a query message to the ISCP 524. The query message is in a standardized format, but it includes the virtual number and the ANI for the calling station 508.

The ISCP 524, in turn, upon receipt of the query, acts through the SCP 542, to access the system's proprietary database at step 807 and to look up the postal zip code corresponding to the received ANI. Other geographic indicators besides zip codes can be used, but for reasons that will become clear, zip codes are preferred. The geographic indicator, whether zip code or otherwise, is transparently used by the subscriber. At step 809, with the postal zip code determined, and from the virtual number, the SCP 542 then turns to the appropriate customer database 550. Database 550 contains a file, created by operation of graphical processor 502 and uploaded therefrom, that relates the zip code to an actual port telephone number. In this case the actual telephone number determined is that of port 510 located in the network access server 512 in served area 504. Once the telephone number is retrieved from the customer database 550, it is forwarded in a response message at step 811 back to the SSP 520 in central office 521. The SSP 520 then, in step 813, resumes its processing of the call by directing it to the second central office 534 which sends it to the port 510.

Although there may be various ways to put together the relational data required for populating a customer database, a graphical terminal, such as terminal 502, provides a way for the subscriber merely to set the geographic boundaries of served territories without having to deal directly with the geographic indicators, zip codes, used in the customer database. Such a terminal would eliminate a need for using manual methods to select and draw boundaries around all of the territories to be served, to pick out of each territory all of the 9-digit postal zip codes and relate them to the appropriate phone number, and then to sort the various territorial data into an organized table for entry into the database.

A personal computer (PC), preferably one that is compatible with MS-DOS and Windows (trademarks of Microsoft Corporation) operating systems may serve as the starting platform for a graphical processing terminal. The software hierarchy for such a processor is illustrated in FIG. 10. At the most basic level are these well known operating systems, MS-DOS and Windows, 901 and 902, respectively. On top of the two operating systems and interactive therewith is a "mapping" software module 903, which is operative to assist in the creation of street and other kinds of local area maps for graphical presentation to a user on the terminal's screen (not illustrated). The mapping software 903 is preferably one of the many commercially available software packages capable of providing a base set of functions for creating maps and a programming language with which particular applications can be integrated with map presentations. Suitable mapping software is available, for example, from MapInfo Corporation of Troy, N.Y. under the names MapInfo for Windows and MapBasic for Windows, and from TerraLogics, a corporation having an office in Reston, Va., under the name TerraView.

Interactive with the mapping software module 903 in the Windows environment is an interfacing software module 904 to facilitate, overall, a "negotiation interface" for area number calling, i.e., for virtual number calling plans. As will become clear, one purpose of the interfacing module 904 combined with the mapping module 903 is to provide a virtual number subscriber the ability to create arbitrarily bounded geometric areas that may include, for example, polygons and circles. These areas are designed by the user as desired to become served areas for specified ports in accordance with files automatically created for those areas that relate postal zip codes to actual phone numbers. Such files can then be exported to the customer data bases maintained for call routing.

As previously described, a customer such as an Internet access provider, by way of example, who has a subscription to a large number of LATA hubs, will have a plurality of telephone numbers equal to the number of hub ports which are subscribed. This may be equal to the number of subscribed LATAs but may be larger if the customer also has both analog and ISDN subscriptions or ports. It will be appreciated that the above described feature of the invention provides a solution to this problem. Thus the PSTN which provides the system and service of the invention also may provide to such a subscriber a single number access service and thereby eliminate the need for such multiple directory numbers. According to a preferred embodiment this is accomplished by utilizing an advanced intelligent network (AIN) overlay with the basic network. With this arrangement the identity of the calling station is determined, a data base is accessed to match this station with a geographical location, a second data base is accessed to match the location to the number of the ISP subscriber node port serving that geographical area, and the call is then routed to the node port number which was obtained.

Referring now to FIGS. 11–15, there is illustrated an arrangement for call redirection pursuant to parameters which may be established by each provider subscriber.

By way of example, an ISP whose business is growing more rapidly than its ability to satisfactorily serve its customers may desire to continue to sign customers, notwithstanding the overload of its existing facilities. This embodiment of the invention provides a mechanism whereby this can be accomplished while at the same time alleviating the growing overload situation. In the Internet usage which currently exists through Internet Service Providers or ISPs, the overload is generally occurring in the links ISP's access servers and modems or routers such as those shown in FIG. 4. However, if the ISP is not a subscriber customer to the system of the invention shown in FIG. 4, its access servers and modems or routers exist separately from those shown in the hub 10 and are owned and maintained by the ISP. That ISP owned transport is not illustrated in FIG. 4. If the ISP is a subscriber customer of the service available through the network of FIG. 4, it will have subscribed for the service of one or more of the access servers and a specified router capacity. When the load which the ISP attempts to handle exceeds that which can be carried either by its own transport facilities or by the subscribed facilities such as shown in FIG. 4, unsatisfactory service will result until the ISP can enlarge and upgrade its own facilities or make arrangements to subscribe to larger facilities in the hub 10. This will result in delay in meeting the demand during which the ISP may lose customers as fast as it signs new ones.

According to this embodiment of the invention an arrangement is provided whereby the ISP may avoid this problem in a manner which may be transparent to its customers, without the necessity of adding to its own plant or purchasing or subscribing to capacity beyond the amount that it needs. This is made feasible according to this feature of the invention by the Telco which is providing the transport service offering to virtually immediately redirect overload on a large number of subscribed lines on an as needed basis at the request of the ISP. Thus the ISP may provide its end user customers with its own advertised telephone numbers while having overload redirected to other numbers and facilities in a manner which may be transparent to the end user customer. According to the invention the end user customer will hear no busy signal but rather will hear the dialed number ring without delay.

As another alternative to this procedure the overloaded ISP may prefer to make an arrangement with a second ISP to handle its overload with or without a voice announcement that service is temporarily being supplied by an alternate ISP pending reduction in circuit load. In this situation the subscriber customer for access server NAS 1 may make a contract arrangement with the subscriber customer for access server NAS 2 to handle the overload. The manner of implementing this service is now described in relation to FIGS. 11–15. Pursuant to still another aspect of the invention, the foregoing avoidance of overload may be effected while concomitantly taking advantage of the nationwide single number service previously described.

Figure 11:
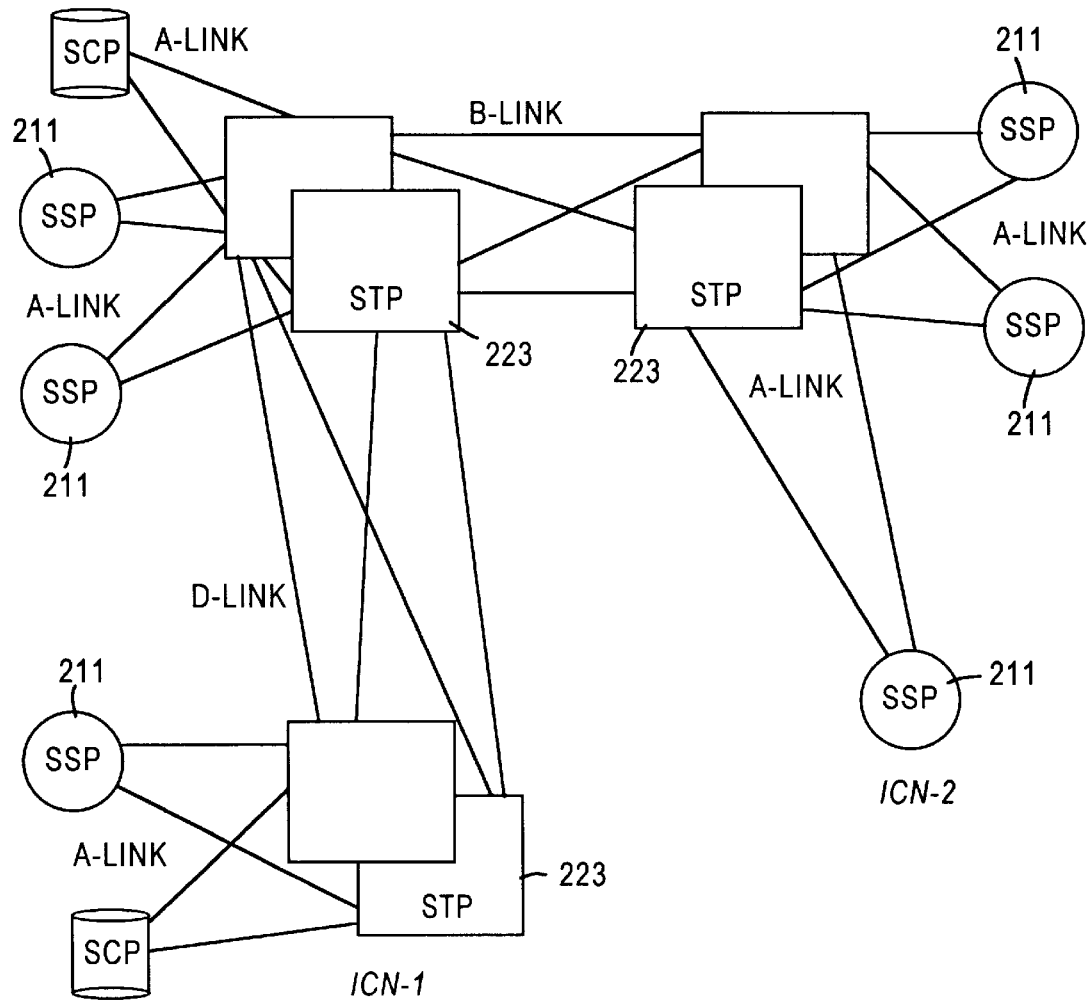
FIG. 11 is a diagram representing a common channel signaling network serving a large geographical area.

FIG. 11 is a diagram of a common channeling interoffice signaling (CCIS) network using SS7 (Signaling System 7) protocol. As is understood by those skilled in the art, when a call is placed, the voice communication is suspended while signaling is transmitted through the common channel signaling network to check whether the line at the destination switch is busy and to determine the voice connection path.

FIG. 11 depicts a network covering a large geographic area including several interconnect network portions denoted, for example, as ICN-1 and ICN-2. Local telephone lines are connected by individual telephone stations in each geographic area to a Service Switching Point (SSP) which may be included in the nearest central office (CO). Each CO connects via trunk circuits (not shown) to one or more of the other COs, and each CO has a CCIS data link to a Switching Transfer Point (STP) 223. Redundant STPs are provided for backup reliability. The trunk circuits carry large numbers of telephone calls between the COs.

Control logic and feature data are located at a centralized node in the network called a Service Control Point (SCP) 243. SSPs communicate with the SCP through the associated STP. B-link or D-link lines interconnect STPs, while A-link lines interconnect the STPs with either SCPs or SSPs. As seen in FIG. 11 the STPs are provided in pairs and these are connected by C-links which are not shown.

If a call requires a feature service such as call redirection, an SSP may be triggered to communicate with an SCP on the basis of the call characteristics, such as originating line or dialed digits. If a trigger occurs, a query message is sent to the SCP to obtain instructions. The SCP, if provided with appropriate data base storage and processing capability, can determine the nature of the service and information appropriate to routing of the call. Redirection of the call can be signaled through the STP(s) to seize a trunk circuit between the originating CO and the redirected destination CO.

Figure 12:
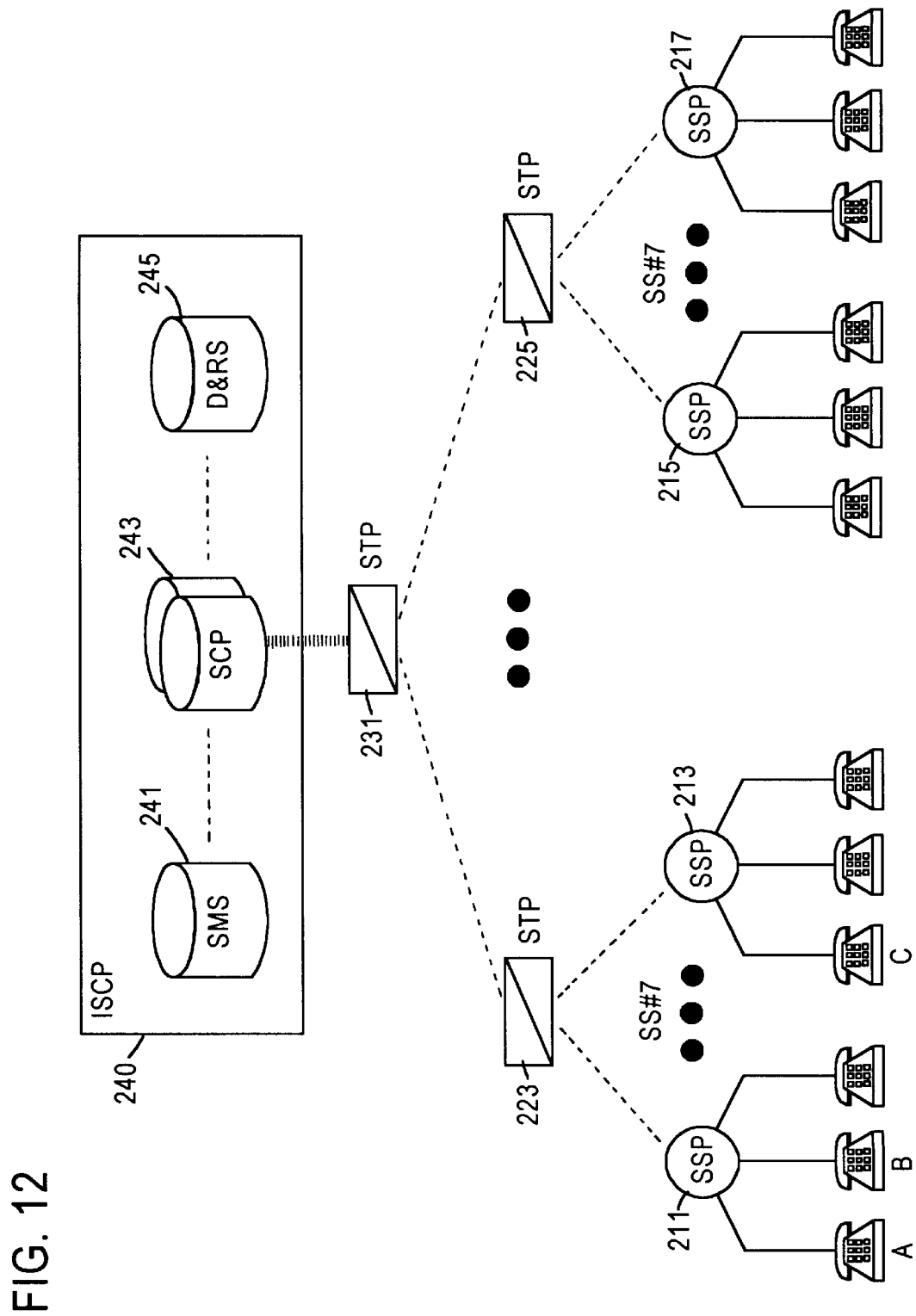
FIG. 12 is a schematic block diagram of the components of an Advanced Intelligent Network system corresponding to portion of the network shown in FIG. 11, shown in somewhat more detail, according to the invention.

FIG. 12 is a more detailed schematic block diagram of the components of an Advanced Intelligent Network (AIN) which may be utilized in accordance with the invention. The SCP 243 is part of a control node having enhanced capabilities to be described in more detail hereinafter. Such enhanced capabilities permit a wider variety of communication features and service control. Calls subject to enhanced features contain information which enable the AIN network to trigger the enhanced operation, such as call redirection, and are hereinafter termed "AIN type calls."

All of the CO's 211, 213, 215 and 217 in the embodiment of FIG. 12 are equipped and programmed to serve as SSPs. Such central office switching systems typically consist of a program controlled digital switch with CCIS communications capabilities. One example of such a switch is a 5ESS type switch manufactured by AT&T. Other vendors, such as Northern Telecom and Siemens, manufacture comparable digital switches. SSPs are appropriately equipped program controlled switches present in the telephone network, which recognize AIN type calls, launch queries to the SCP or an ISCP, and receive commands and data from the ISCP to further process the AIN calls. In instances in which the SSP functionality is not present in the CO, end offices without such functionality forward calls to an SSP at its prescribed point in the network.

The SSPs 211 and 213 connect to a first local area STP 223, and the SSPs 215 and 217 connect to a second local area STP 225. The connections to the STPs comprise digital links normally used for signalling purposes. As indicated by the black dots below STPs 223 and 225, each local area STP can connect to a large number of SSPs. Although not shown in FIG. 12, as in FIG. 11, the central offices or SSPs are interconnected to each other by trunk circuits for carrying telephone services.

The local area STPs 223 and 225, and any number of other such local area STPs, shown as black dots between STPs 223 and 225, communicate with an STP 231 associated directly with an ISCP 240 to serve the entire area. The STP hierarchy can be expanded or contracted to as many levels as needed to serve appropriately subscriber demand. The links 223 and 225 between the COs and the local area STPs are dedicated CCIS links, typically SS7 type interoffice data communication channels. The local area STPs are in turn connected to each other and to the regional STP 231 via a packet switched network. The regional STP 231 also communicates with the ISCP 240 via a packet switched network, in this instance an SS7 CCIS network.

The ISCP 240 is an integrated system. Among other system components, the ISCP 240 includes a Service Management System (SMS) 241, a Data and Reporting System (DRS) 245 and the Service Control Point (SCP) 243. It will be understood that an ISCP and an SCP perform the same function but an ISCP comprises an SCP of larger capacity than the usual SCP. The ISCP also typically includes a terminal subsystem referred to as a Service Creation Environment or SCE (not shown) for programming the data base in the SCP 243 for the services subscribed to by each individual business customer.

The messages transmitted between the SSPs and the ISCP are all formatted in accord with the Transaction Capabilities Applications Protocol (TCAP). The TCAP protocol provides standardized formats for various query and response messages. Each query and response includes data fields for a variety of different pieces of information relating to the current call. An initial TCAP query from an SSP includes, among other data, a "Service Key" which is the calling party's address and digits representing the called party address. The TCAP specifies a number of additional message formats, for example a format for a subsequent query from the SSP, and formats for responses. Such responses may be of varying types and include INVOKE responses for instructing the SSP to perform a specific function, such as play an announcement, play an announcement and collect digits, or gather information from another resource.

Each central office switching system normally responds to a service request on a local communication line connected thereto to selectively connect the requesting line to another selected local communication line. The connection can be made locally through only the connected central office switching system if the originating location and the destination location are served by the same central office switch. For example, for a call from station A to station B the SSP 211 provides the call connection without any connection to another central office. When the called line connects to a distant station, for example when station A calls station C, the connection is made through the connected central office switching system SSP 211 and at least one other central office switching system SSP 213 through the telephone trunks interconnecting the two COs.

Although shown as telephones in FIG. 12, the terminals or stations can comprise any communication device compatible with the line. In establishing an Internet connection this usually comprises personal computers or PCs connected to the local link through modems.

Figure 13:
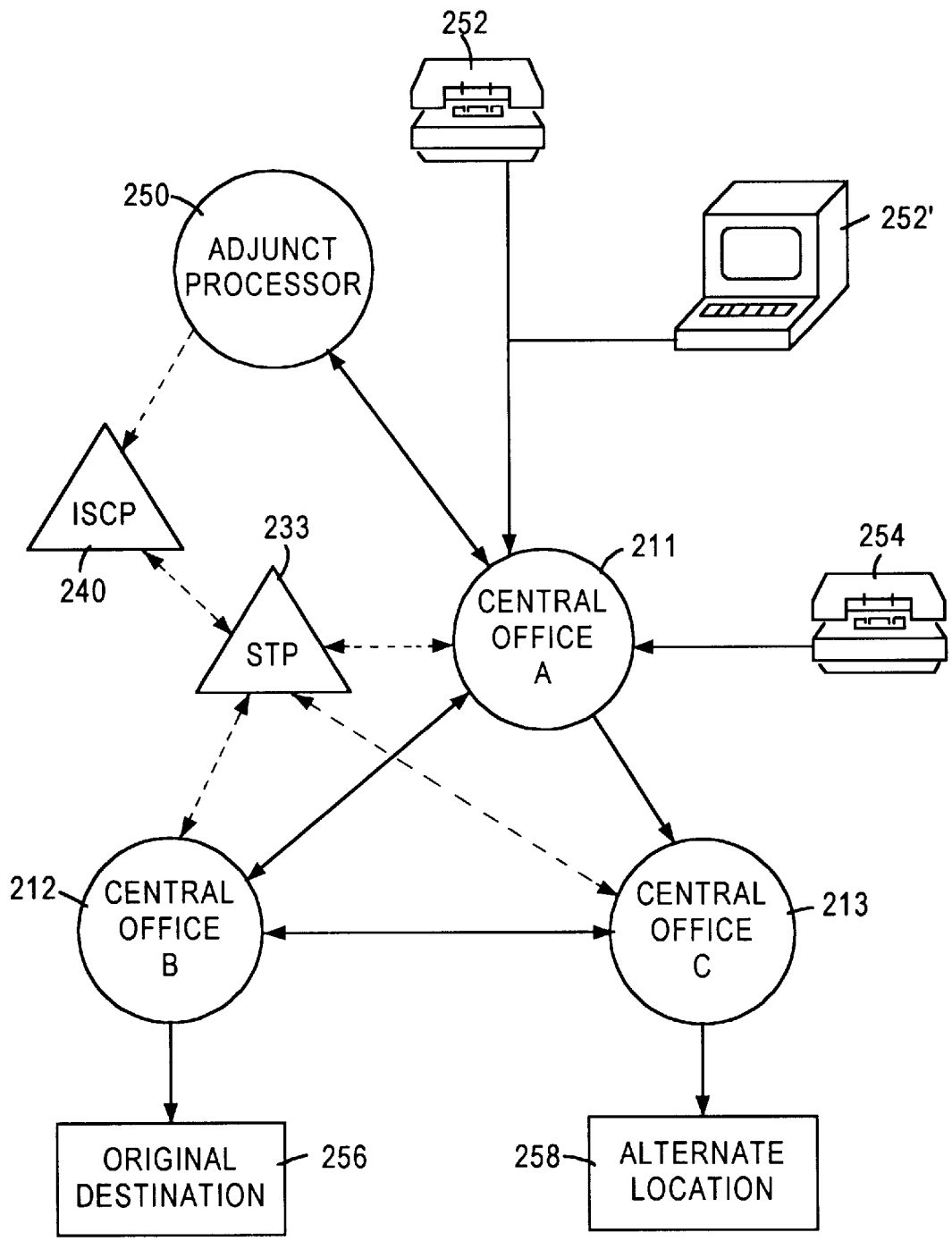
FIG. 13 is a schematic block diagram, according to the invention, depicting the network interconnection and signaling paths in the course of a redirection of a call from an originating telephone set and additionally depicting network elements for redirection set up.

FIG. 13 is a diagram representing an AIN network, including the service creation environment, signaling network and interoffice trunks. Similar to FIG. 12, COs 211, 212 and 213 are associated with STP 223, under control of ISCP 240. Station 254, representing an originating call, is served by CO 211. Blocks 256 and 258 represent destination locations served respectively by COs 212 and 213. SS7 signaling paths are depicted by dashed lines; voice communication paths are indicated by solid lines.

A subscriber may set up the redirection service, or make changes to an earlier set up, through adjunct processor 250, part of the service creation environment, which can be accessed by any station 252. Appropriate security procedure is provided, which may include PIN and password identification. The adjunct processor accepts redirection information from the subscriber to be loaded into the data base in ISCP 240.

FIG. 15 shows charts indicating examples of redirection set up plans. One or more charts of this type would be formulated by the subscriber or ISP to cope with his overload redirection needs. The subscriber ISP may supply suitable templates as an aid to inputting the information into the adjunct processor. Such information may be transmitted in a set up call or, alternatively, the subscriber may send the completed template by mail or facsimile to the service creation environment. In the redirection set up, multiple plans may be stored in the data base, one of which is chosen to be currently operative. The subscriber may switch plans at any time simply by dialing into the adjunct processor. Several such alternative options may be stored in the data base for future selection.

The left-hand column of the charts in FIG. 15, headed by the title "Main Number," contains telephone numbers of the subscriber which are to be redirected to other locations. The remaining columns, entitled "Option #1", "Option #2", and "Option #3", each contain an alternative set of redirection information corresponding to the telephone numbers listed in the first column. It will be noted that Option #1 in FIGS. 15(a) and 15(c) do not redirect the calls.

As shown, each row of the template may contain one or more telephone numbers that are designated for incoming call redirection to one or more destinations. The "Main Number" designations in each row correspond to the same redirection numbers in that row. The main numbers may be from the same or different geographic areas and different main numbers may be listed for specified time periods.

The chart shown in FIG. 15(a) shows in Option #1 no redirection, in Option #2 a first redirection of all of the Main Numbers, and in Option #3 a second redirection of all of the Main Numbers. This redirection may be 100 percent according to Option #2, 100 percent according to Option #3, or alternately, a fifty percent apportionment to each of two redirect destinations for incoming calls to the main numbers shown in the row. The particular option may be on a timed basis such as shown in the chart in FIG. 15(b). Apportionment of the calls may be without human intervention in accordance with data base information. Alternatively the redirection may be initiated and/or terminated under control of the subscriber. The listings in FIGS. 15(a) and 15(b) represent selected examples of various possibilities. Additional destinations can be included in each row with different apportionment percentages. Such an example is shown in FIG. 15(c) where the main number retains 70% of the load. The number of redirected destinations and percentage apportionment, if any, may alternatively be associated with a time schedule based, for example, on time of day or day of week.

A description of the manner in which the arrangement of FIG. 13 may redirect a dialed call is aided by the flow chart shown in FIG. 14. It is to be understood that, in practice, the communications network is widespread, including a multitude of COs, STPs and ISCPs, and it is possible to enable call redirection from any one location to any other location in accordance with the invention.

In the call exemplified, it is assumed that the call is originated at station 254, associated with central office A 211. The central office detects the off-hook condition and dialed digits, steps 260 and 262. Common channel signaling is initiated while the call is suspended and the signaling information is transmitted by central office A 211 to STP 223, step 263. The STP 223 determines that end office B 212 corresponds to the dialed call destination, step 264, and transmits signaling information to that end office, step 265. At the end office B 212 a query is made for a redirect trigger, step 266. If a determination is made in step 267 that no redirection trigger is set, a trunk connection, step 268, is established between central office A 211 and central office B 212.

If it is determined in step 267 that a redirect trigger has been set, a TCAP message is transmitted with the signaling information to the ISCP 240 via the STP 223, step 269. The ISCP 240 looks up redirection information in the data base, step 70, and transmits redirection information to STP 223, step 71. In step 272, trunk routing is established between central office A 11 and central office C 213, which corresponds to redirected alternate location 258.

In the example discussed, the trigger is regarded as a terminating trigger because the terminating office stores the trigger flag associated with the dialed number. Alternately flag information may be removed from the central office switch to the STP. With such replacement, the trigger may be regarded as a form of originating trigger as determination is made earlier in the signaling path. An originating trigger either in the originating CO or SSP would permit redirection based on allocation of virtual numbers to the subscriber, as in a single number environment described above. Dialing a virtual number would trigger the originating office to direct signaling to the ISCP for the determination of the redirected destination in accordance with the redirection plan stored in the ISCP data base.

The ISCP, through information stored in its data base, supervises the call redirection signaling process. As part of the AIN network, the ISCP can track the redirected calls as well as redirection set up transactions. Such transactions include set up changes to any number of individual lines, addition or deletion of templates in data base storage and set up of a redirection trigger on demand by a subscriber call in. A report can be generated for individual subscribers that will describe the redirection transaction for each time the ISCP is referenced.

In this disclosure there is shown and described only the preferred embodiment of the invention and but a few examples of its versatility. It is to be understood that the invention is capable of use in various other combinations and environments and is capable of changes or modifications within the scope of the inventive concept as expressed herein. After reading the foregoing specification, one of ordinary skill in the art will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A communications network for providing access to a wide area internetwork via a switched telephone network serving a plurality of geographic areas comprising:

a plurality of central office switching systems in said telephone network in said geographic areas connected to a plurality of premises terminals in premises served by said switching systems;

a common channel signaling network interconnecting said central office switching systems through at least one signal transfer point coupled to a controller for said common channel signaling network, said controller having data storage;

internetwork service providers each connected to said internetwork and coupled to at least selected ones of said plurality of premises terminals via dial-up links to said switching systems;

a data hub node in at least one of said geographic areas, said data hub node including a gateway router connected via at least one access server to one of said central office switching systems for providing switched connection between selected ones of said premises terminals and one of said internetwork service providers;

a first of said internetwork service providers being coupled to certain of said plurality of premises terminals via dial-up links using a first group of numbers;

said data storage in said controller having stored therein a second group of numbers for providing switched connection between said certain of said premises terminals and said first of said internetwork service providers via one of said access servers; and trigger means actuatable under conditions specified by said first of said internetwork service providers wherein, when said trigger means is in an actuated condition, a call from one of said certain of said plurality of premises terminals to one of said numbers in said first group of numbers is redirected to one of said numbers in said second group of numbers to establish a link between said one of said plurality of premises terminals to said one of said access servers and said gateway router to said first of said internetwork service providers.

2. A communications network according to claim 1 wherein, when said trigger means is in an actuated condition, calls to each of said numbers in said first group of number are redirected to predetermined numbers in said second group of numbers.

3. A communications network according to claim 1 wherein, when said trigger means is in an actuated condition, a predetermined percentage of calls to each of said numbers in said first group of numbers is redirected to predetermined numbers in said second group of numbers.

4. A communications network according to claim 1 wherein the identity of the numbers in said first group may be concurrently established by said first of said internetwork service providers.

5. A communications network according to claim 1 wherein the identity of the numbers in said second group may be concurrently established by said first of said internetwork service providers.

6. A communications network according to claim 1 wherein the identity of the numbers in said first and second groups may be concurrently established by said first of said internetwork service providers.

7. A communications network according to claim 1 wherein the actuation of the trigger means upon the occurrence of said conditions substantially simultaneously creates a redirection status with respect to all numbers in said first group.

8. A communications network according to claim 1 wherein said conditions are time sensitive.

9. A communications network according to claim 1 wherein said conditions may be manually established and de-established by said first of said internetwork service providers.

10. A communications network according to claim 1 wherein said numbers in said first group correspond to a virtual number whereby the dialing of the virtual number by one of said premises terminals results in a call to at least one of the numbers in said first group.

11. A communications network for providing access to a wide area internetwork via a switched telephone network serving a plurality of geographic areas comprising:

a plurality of central office switching systems in said telephone network in said geographic areas connected to a plurality of premises terminals in premises served by said switching systems; a common channel signaling network interconnecting said central office switching systems through at least one signal transfer point coupled to a controller for said common channel signaling network, said controller having data storage;

a switched multimegabit data service (SMDS) network spanning said geographic areas;

internetwork service providers each connected to said internetwork and coupled to at least selected ones of said plurality of premises terminals via dial-up links to said switching systems;

data hub nodes in said geographic areas, each said data hub node including a gateway router connected via at least one access server to one of said central office switching systems for providing switched connection between selected ones of said premises terminals and one of said internetwork service providers via said SMDS network;

a first of said internetwork service providers being coupled to certain of said plurality of premises terminals via dial-up links using a first group of numbers;

said data storage in said controller having stored therein a second group of numbers for providing switched connection between said certain of said premises terminals and said first of said internetwork service providers via one of said access servers; and trigger means actuatable under conditions specified by said first of said internetwork service providers, wherein when said trigger means is in an actuated condition, a call from one of said certain of said plurality of premises terminals to one of said numbers in said first group of numbers is redirected to one of said numbers in said second group of numbers to establish a link between said one of said plurality of premises terminals to said one of said access servers and its associated gateway router and said SMDS network to said first of said internetwork service providers.

12. A communications network according to claim 11 including:

a frame relay network spanning said geographic areas;

a central maintenance center for monitoring and maintaining said communications network, said central maintenance center being connected to said SMDS network and to said frame relay network and through said SMDS and frame relay networks to said data hub nodes;

said central maintenance center monitoring and maintaining said communications network through said SMDS and frame relay networks and said data hub nodes.

13. A communications network according to claim 12 wherein said data hub nodes include an administrative router coupling said packet switch in said data hub node to said frame relay network and through said frame relay network to said central maintenance center.

14. In a communications network for providing access to a wide area internetwork via a switched telephone network serving a plurality of geographic areas and having a plurality of central office switching systems in said geographic areas connected to a plurality of premises terminals in premises served by said switching systems and a common channel signaling network interconnecting said central office switching systems through at least one signal transfer point coupled to a controller for said common channel signaling network, said controller having data storage;

a method for providing for said premises terminals through a network node having access servers and a router, alternate access to an internetwork service provider having a group of dial-up access links having a first group of numbers, said method comprising the steps of:

storing call redirection information concurrently for said first group of numbers in said data storage;

setting a trigger in the switched telephone network for each of the numbers in said first group of numbers, said trigger being actuatable upon the occurrence of pre-established conditions;

establishing said conditions;

upon said conditions being satisfied redirecting calls for said dial-up access links having said first group of numbers to a second group of access links wherein at least one of said links in said second group is connected to one of said access servers; and routing said call from said router to a predetermined one of said internet service providers associated with said conditions.

15. A method according to claim 14 wherein said second group of access links is identified by numbers which are stored in said data storage in correspondence to said first group of numbers.

16. A method according to claim 14 wherein the numbers in said first group correspond to a virtual number whereby the dialing of the virtual number by one of said premises terminals results in a call to at least one of the numbers in said first group.

17. A method according to claim 14 wherein said step of storing call redirection information comprises:

accessing through said switched telephone network a processor in communication with said controller; and concurrently transmitting redirection information for said group of numbers to said processor for storage in said data storage.

18. A method according to claim 14 wherein said redirection information indicates a plurality of alternative destinations for at least one of the numbers in said group.

19. A method according to claim 18 wherein said redirection information designates an apportionment percentage for call redirection to said alternative destinations.

20. A method according to claim 18 wherein said redirection information designates a time schedule for call redirection to each of said alternative destinations.

21. A method according to claim 14 wherein said redirection information includes at least a first and second set of call redirection destinations for said numbers in said first group, one of said sets selected for current operation.

22. A method according to claim 21 further comprising the step of updating said data base by selecting a different set for current operation.

* * * * *